US012191603B2

(12) United States Patent
Pan et al.

(10) Patent No.: US 12,191,603 B2

(45) Date of Patent: Jan. 7, 2025

(54) FIRST ELECTRICAL CONNECTOR, SECOND ELECTRICAL CONNECTOR AND ELECTRICAL CONNECTOR ASSEMBLY

(71) Applicant: Molex, LLC, Lisle, IL (US)

(72) Inventors: Hua Pan, Shanghai (CN); You-Xiang Zheng, Shanghai (CN)

(73) Assignee: Molex, LLC, Lisle, IL (US)

( * ) Notice: Subject to any disclaimer, the term of this patent is extended or adjusted under 35 U.S.C. 154(b) by 394 days.

(21) Appl. No.: 17/830,490

(22) Filed: Jun. 2, 2022

(65) Prior Publication Data

US 2022/0393402 A1 Dec. 8, 2022

(30) Foreign Application Priority Data

Jun. 3, 2021 (CN) ......................... 202110618512.4
Jun. 3, 2021 (CN) ......................... 202121240959.4

(51) Int. Cl.
*H01R 13/641* (2006.01)
*H01R 13/516* (2006.01)
(Continued)

(52) U.S. Cl.
CPC ......... *H01R 13/641* (2013.01); *H01R 13/516* (2013.01); *H01R 13/629* (2013.01); *H01R 13/639* (2013.01)

(58) Field of Classification Search
CPC .............. H01R 13/641; H01R 13/6347; H01R 13/516; H91R 13/6348
(Continued)

(56) References Cited

U.S. PATENT DOCUMENTS 4,946,398 A * 8/1990 Takenouchi ....... H01R 13/4368 439/752
5,004,436 A * 4/1991 Aoyama ............ H01R 13/4368 439/752

(Continued)

FOREIGN PATENT DOCUMENTS

TW D205956 S 7/2020
TW D207875 S 10/2020

OTHER PUBLICATIONS

Molex Micro-Fit 3.0 dual row, available in Amazon.com, date first available Dec. 30, 2017 [online], [site visited Jul. 20, 2023], Available from the internet URL: https://www.amazon.com/Molex-Micro-Fit-Circuits-receptacle-Terminal/ dp/B078Q798L9/ (Year: 2017), 01 pages.

(Continued)

*Primary Examiner* — Neil Abrams

(57) ABSTRACT

A first electrical connector, a second electrical connector and an electrical connector assembly are provided. The first electrical connector includes: a first connector housing including a main body, a locking mechanism which extend forwardly from an upper surface of the main body and a plurality of mating posts which extend forwardly a front surface of the main body, each mating post is interiorly formed with a first terminal receiving cavity which penetrates in a front-rear direction, a first prevent mis-insertion protruding rib protrudes from a middle portion of at least one of the mating posts, and a second prevent mis-insertion protruding rib protrudes from a side edge of at least one of the mating posts; and a plurality of first conductive terminals which are correspondingly inserted into mating posts, each first conductive terminal comprises a first mating portion which is received in the corresponding first terminal receiving cavity and a first tail portion which is positioned behind (Continued)

the first mating portion. It facilitates correct mating between the first electrical connector and the second electrical connector.

26 Claims, 14 Drawing Sheets

(51) Int. Cl.
*H01R 13/629* (2006.01)
*H01R 13/639* (2006.01)

(58) Field of Classification Search
USPC ..................................................... 439/680, 752
See application file for complete search history.

(56) References Cited

U.S. PATENT DOCUMENTS

| | | | | |
|---|---|---|---|---|
| 5,059,142 | A * | 10/1991 | Ohta | H01R 13/4368 439/752 |
| 5,292,261 | A * | 3/1994 | Hirano | H01R 13/4368 439/752 |
| 5,342,221 | A * | 8/1994 | Peterson | H01R 13/514 439/877 |
| 5,439,397 | A * | 8/1995 | Yamanashi | H01R 13/4368 439/752 |
| D366,646 | S | 1/1996 | Carr | |
| D410,629 | S | 6/1999 | Bandura et al. | |
| D425,869 | S | 5/2000 | Yokomizo et al. | |
| 6,165,024 | A * | 12/2000 | Ko | H01R 13/64 439/680 |
| 6,168,475 | B1 * | 1/2001 | Ko | H01R 13/6456 439/680 |
| 6,666,718 | B2 * | 12/2003 | Endo | H01R 13/4362 439/752 |
| D494,141 | S | 8/2004 | Spink, Jr. | |
| D524,751 | S | 7/2006 | Lee et al. | |
| 7,252,556 | B2 * | 8/2007 | Anbo | H01R 13/4367 439/752 |
| 7,387,545 | B2 | 6/2008 | Tyler et al. | |
| 7,393,233 | B2 * | 7/2008 | Machida | H01R 13/4223 439/752 |
| D597,956 | S | 8/2009 | Sakamoto | |
| 8,860,889 | B2 * | 10/2014 | Choi | H01R 12/712 348/730 |
| D801,278 | S | 10/2017 | Li et al. | |
| D803,161 | S | 11/2017 | Li et al. | |
| D803,162 | S | 11/2017 | Li | |
| D840,938 | S | 2/2019 | Hsu | |
| D847,756 | S | 5/2019 | Endo et al. | |
| D853,334 | S | 7/2019 | Mastel | |
| 10,355,393 | B2 | 7/2019 | Yi et al. | |
| D894,126 | S | 8/2020 | Somanathapura Ramanna | |
| D894,127 | S | 8/2020 | Somanathapura Ramanna | |
| D895,552 | S | 9/2020 | Somanathapura Ramanna | |
| D906,973 | S | 1/2021 | Thyagaraj et al. | |
| D906,978 | S | 1/2021 | Ganamukhi | |
| D911,964 | S | 3/2021 | Ganamukhi | |
| D911,965 | S | 3/2021 | C et al. | |
| D925,459 | S | 7/2021 | Aromin et al. | |
| D925,460 | S | 7/2021 | Aromin et al. | |
| D938,362 | S | 12/2021 | Ito et al. | |
| D938,919 | S | 12/2021 | Ito | |
| D941,771 | S | 1/2022 | Ito et al. | |
| D973,598 | S | 12/2022 | Tian | |
| D975,024 | S | 1/2023 | Wei et al. | |
| D1,006,812 | S | 12/2023 | Francis | |
| D1,008,978 | S | 12/2023 | Böcker et al. | |
| 2004/0110427 | A1 * | 6/2004 | Shi | H01R 13/4367 439/752 |
| 2011/0294361 | A1 * | 12/2011 | Schrader | H01R 13/64 439/680 |
| 2016/0336669 | A1 | 11/2016 | Li | |
| 2019/0157797 | A1 | 5/2019 | Mcdowell | |
| 2019/0280430 | A1 | 9/2019 | Azad et al. | |
| 2020/0227857 | A1 | 7/2020 | Kim et al. | |
| 2021/0044055 | A1 | 2/2021 | Chen et al. | |
| 2022/0006235 | A1 | 1/2022 | Kirschner et al. | |
| 2022/0393402 | A1 * | 12/2022 | Pan | H01R 13/629 |
| 2024/0072492 | A1 * | 2/2024 | Jin | H01R 13/639 |

OTHER PUBLICATIONS

Non-Final office action for U.S. Appl. No. 29/817,525 mailed on Aug. 23, 2023, 10 pages.
Non-Final office action received for U.S. Appl. No. 29/817,711, mailed on Aug. 23, 2023, 10 pages.
Notice of allowance received in U.S. Appl. No. 29/817,525, mailed on Mar. 1, 2024, p. 6.
Notice of allowance received in U.S. Appl. No. 29/817,711, mailed on Feb. 29, 2024, p. 6.

* cited by examiner

FIRST ELECTRICAL CONNECTOR, SECOND ELECTRICAL CONNECTOR AND ELECTRICAL CONNECTOR ASSEMBLY

CROSS-REFERENCE TO RELATED APPLICATIONS

This application claims priority to Chinese Patent Application No. 202110618512.4, filed on Jun. 3, 2021, and to Chinese Utility Model No. 202121240959.4, filed on Jun. 3, 2021, each of which are incorporated herein by reference in their entireties.

TECHNICAL FIELD

The present disclosure relates to the field of electrical connectors, and particularly relates to a first electrical connector, a second electrical connector and an electrical connector assembly which facilitate correct mating. Furthermore, particularly relates to an electrical connector which can assure a position of a terminal and facilitate assembling.

BACKGROUND

Chinese invention patent application publication No. CN112350092A discloses a power connector and a terminal. The power connector includes a plug connector and a receptacle connector which mates with the plug connector along a front-rear direction. The plug connector includes an insulative housing and a plurality of female terminals positioned in the insulative housing, the insulative housing interiorly defines a plurality of terminal receiving grooves which each extend along the front-rear direction, each female terminal is positioned in the corresponding terminal receiving groove. The receptacle connector includes an insulating housing and a plurality of male terminals positioned in the insulating housing.

In this solution, corresponding insertion structures of the plug connector and the receptacle connector each are regularly square-shaped and each are not provided with a prevent mis-insertion structure, when there are a plurality of connector assemblies, which are similar in outer profile but are different in specific function, in one electronic system, there could be some possibility to make the connector assembly with different function to be wrongly mated, so it needs to be further improved.

Furthermore, Chinese invention patent application publication No. CN111435772A relates to a connector assembly which includes a cap housing, a plug and two terminal position assure (TPA) components, the cap housing contains a first terminal, the plug has a first end portion which contains a first terminal and a second end portion which can insert into the cap housing, the two terminal position assure (TPA) components are provided at a first end portion of the cap housing connected with a wire and the first end portion of the plug, each TPA component includes a first block and a second block which are separated from each other in a circumferential direction of the wire. The two TPA components are coupled into the plug and the cap housing, so as to prevent a foaming member from infiltrating into the connector assembly via the first end portion of the plug and the first end portion of the cap housing.

In this solution, each TPA component includes the first block and the second block, the first block and the second block are provided to closely surround the wire, when the first block and the second block are mounted into the plug or the cap housing, the first block and the second block easily interfere with each other to make mounting of each TPA component difficult, so it needs to be further improved.

SUMMARY

A technical problem to be solved by the present disclosure is to overcome a deficiency in the above prior art and provide a first electrical connector, a second electrical connector and an electrical connector assembly which facilitate correct mating.

According to one aspect of the present disclosure, the present disclosure provides a first electrical connector, comprising: a first connector housing comprising a main body, a locking mechanism which extend forwardly from an upper surface of the main body and a plurality of mating posts which extend forwardly a front surface of the main body, each mating post is interiorly formed with a first terminal receiving cavity which penetrates in a front-rear direction, a first prevent mis-insertion protruding rib protrudes from a middle portion of at least one of mating posts, and a second prevent mis-insertion protruding rib protrudes from a side edge of at least one of mating posts; and a plurality of first conductive terminals which are correspondingly inserted into the mating posts, each first conductive terminal comprises a first mating portion which is received in the corresponding first terminal receiving cavity and a first tail portion which is positioned behind the first mating portion.

According to another aspect of the present disclosure, the present disclosure provides A second electrical connector, comprising: a second connector housing having a plurality of second terminal receiving cavities which are recessed from a front surface of the second connector housing, a locking protrusion which protrudes from an upper surface of the second connector housing, and an elastic snapping claw which extends rearwardly from two side surfaces of the second connector housing and two stopping portions which are respectively positioned at an upper side and a lower side of each corresponding snapping claw, a first prevent mis-insertion notch is recessed from a middle portion of at least one of second terminal receiving cavities, and a second prevent mis-insertion notch is recessed from a side of at least one of second terminal receiving cavities; and a plurality of second conductive terminals, each second conductive terminal comprises a second mating portion which is inserted into the corresponding second terminal receiving cavity and a second tail portion which is positioned behind the second mating portion.

According to still another aspect of the present disclosure, the present disclosure provides an electrical connector assembly, comprising the first electrical connector as above and the second electrical connector as above, the mating post of the first connector housing inserts into the corresponding second terminal receiving cavity of the second connector housing so as to make the first mating portion of the first conductive terminal and the second mating portion of the corresponding second conductive terminal electrically connected, the first prevent mis-insertion protruding rib inserts into the corresponding first prevent mis-insertion notch, the second prevent mis-insertion protruding rib inserts into the corresponding second prevent mis-insertion notch, the locking mechanism and the locking protrusion are locked with each other.

In comparison with the prior art, the present disclosure at least has following advantages: in the first electrical connector of the present disclosure, a plurality of mating posts of the first connector housing are selectively provided with the first prevent mis-insertion protruding rib and the second prevent mis-insertion protruding rib, the first prevent mis-insertion protruding rib and the second prevent mis-insertion protruding rib are provided to the different mating posts, so that the first prevent mis-insertion protruding rib and the second prevent mis-insertion protruding rib may combine with each other to form various different prevent mis-insertion assemblies and facilitate correct mating between the first electrical connector and the second electrical connector which have the same functions. In addition, the first electrical connector further is provided with a locking mechanism, the locking mechanism may be used to be locked with a second electrical connector which is correctly mated with the first electrical connector, so mating between the two electrical connectors is strengthened.

In the second electrical connector of the present disclosure, a plurality of second terminal receiving cavities of the second connector housing are selectively provided with the first prevent mis-insertion notch and the second prevent mis-insertion notch, the first prevent mis-insertion notch and the second prevent mis-insertion notch are provided to different second terminal receiving cavities, so that the first prevent mis-insertion notch and the second prevent mis-insertion notch may combine with each other to form various different prevent mis-insertion assemblies and facilitate correct mating between the first electrical connector and the second electrical connector which have the same functions. In addition, the side surfaces of the second electrical connector are further formed with elastic snapping claws which may make the second electrical connector firmly snap onto a panel of an electronic device, the stopping portions at an upper side and a lower side of the elastic snapping claw may prevent an operator from unintentionally touching the elastic snapping claw, so as to promote reliability of a snapping state of the elastic snapping claw with the panel.

Furthermore, a technical problem to be solved by the present disclosure is to overcome deficiency in the above prior art and provide an electrical connector which can assure a position of a terminal and facilitate assembling.

The present disclosure employs following technical solution. An electrical connector comprises: a connector housing, the connector housing is provided with a plurality of terminal receiving cavities which each penetrate in a front-rear direction and a plurality of guide protruding ribs which respectively protrude into the plurality of terminal receiving cavities, the plurality of terminal receiving cavities are arranged as an upper row and a lower row, two latches are provided in a left side and a right side of the connector housing respectively; a plurality of conductive terminals which are correspondingly mounted to the plurality of terminal receiving cavities; and a terminal position assurance component comprising: a base portion, a rear surface of the base portion is provided with a recessed groove which extends along a transverse direction; a plurality of terminal abutting portions which respectively extend forwardly from an upper side and a lower side of the base portion and correspondingly enter into the plurality of terminal receiving cavities, the plurality of terminal abutting portions forwardly abut against the plurality of conductive terminals respectively to prevent the plurality of conductive terminals from withdrawing rearwardly from the connector housing, a front end of each terminal abutting portion is provided with a guiding notch which cooperates with the corresponding guide protruding rib; and two locking portions which respectively extend forwardly from a left side and a right side of the base portion and respectively lock with the two latches.

In comparison with the prior art, the present disclosure at least has following advantages: the electrical connector of the present disclosure is provided with a terminal position assurance component, by that the terminal abutting portions arranged in the upper row and the terminal abutting portions arranged in the lower row forwardly abut against the plurality of conductive terminals respectively, the terminal position assurance component prevents the plurality of conductive terminals from rearwardly withdrawing from the connector housing, assures reliability of positions of the plurality of conductive terminals of the electrical connector, promotes reliability of electrical connection of the electrical connector when the electrical connector mates with another electrical connector. Here, the rear surface of the terminal position assurance component is provided with a recessed groove, so that the terminal position assurance component has better elasticity to absorb manufacturing tolerance, and may allow the terminal abutting portions in the upper row and the terminal abutting portions in the lower row to splay so as to facilitate mounting of the terminal position assurance component into the connector housing; and, the guiding notch of the terminal abutting portion and the guide protruding rib of the connector housing cooperate with each other to facilitate alignment of the terminal abutting portion with the corresponding conductive terminal and insertion of the terminal abutting portion into the corresponding terminal receiving cavity so that the terminal abutting portion abuts against the corresponding conductive terminal.

THE REFERENCE NUMERALS ARE REPRESENTED AS FOLLOWS

100 electrical connector assembly

1 first electrical connector

Figure 1:
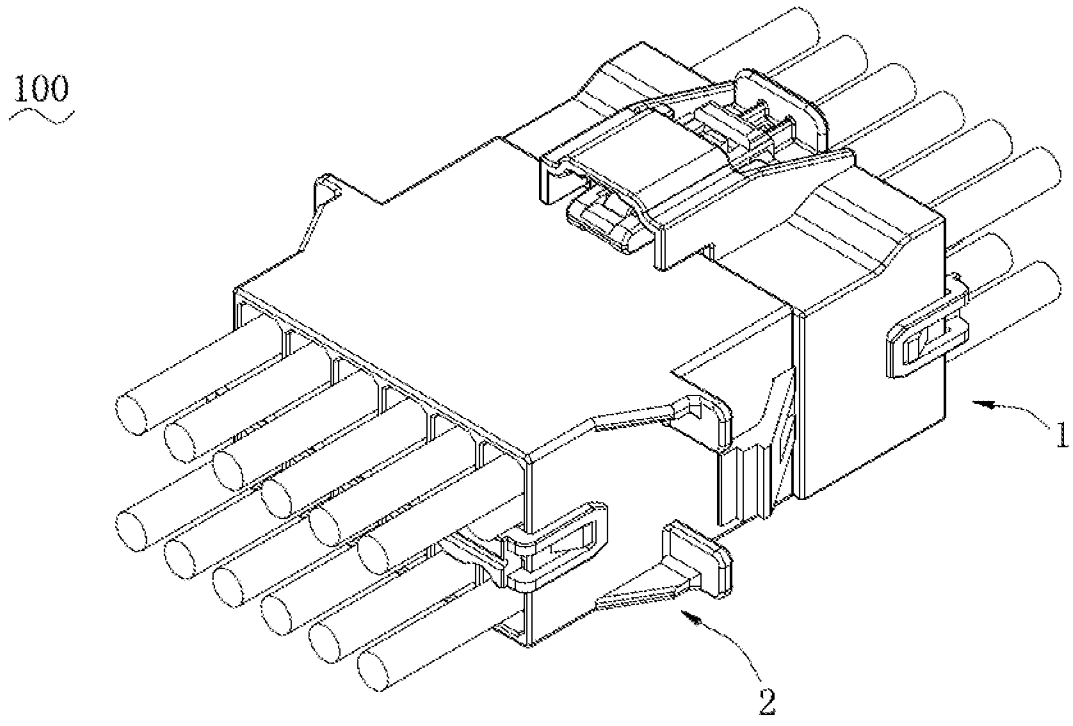
FIG. 1 and FIG. 2 are perspective views of an electrical connector assembly of a preferred embodiment of the present disclosure from two different angles.
Figure 2:
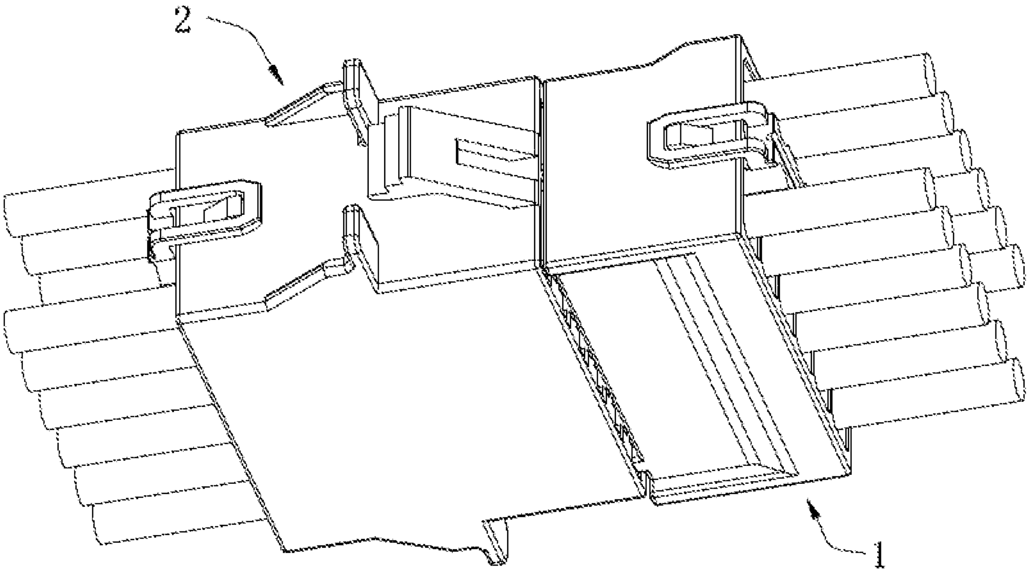
Figure 3:
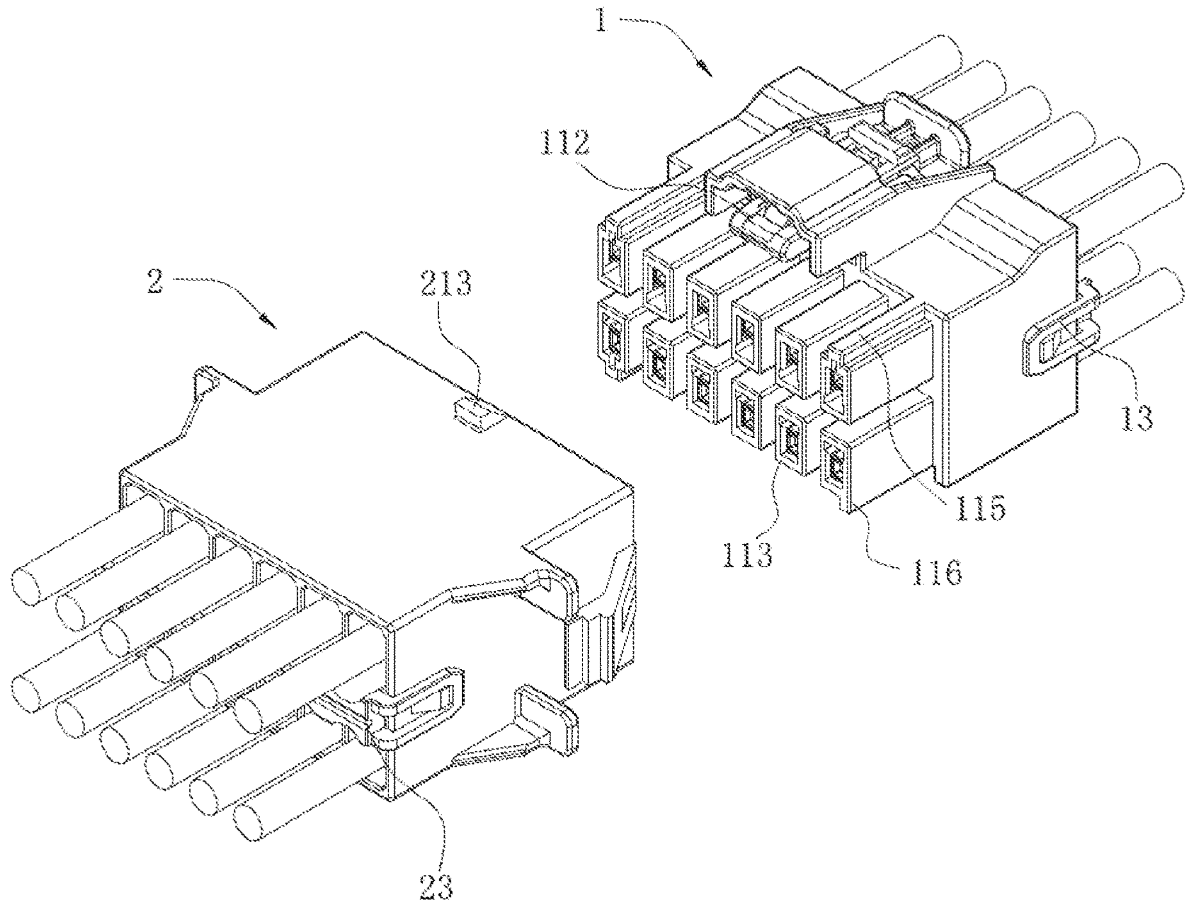
FIG. 3 and FIG. 4 are perspective exploded views of FIG. 1 from two different angles.
Figure 4:
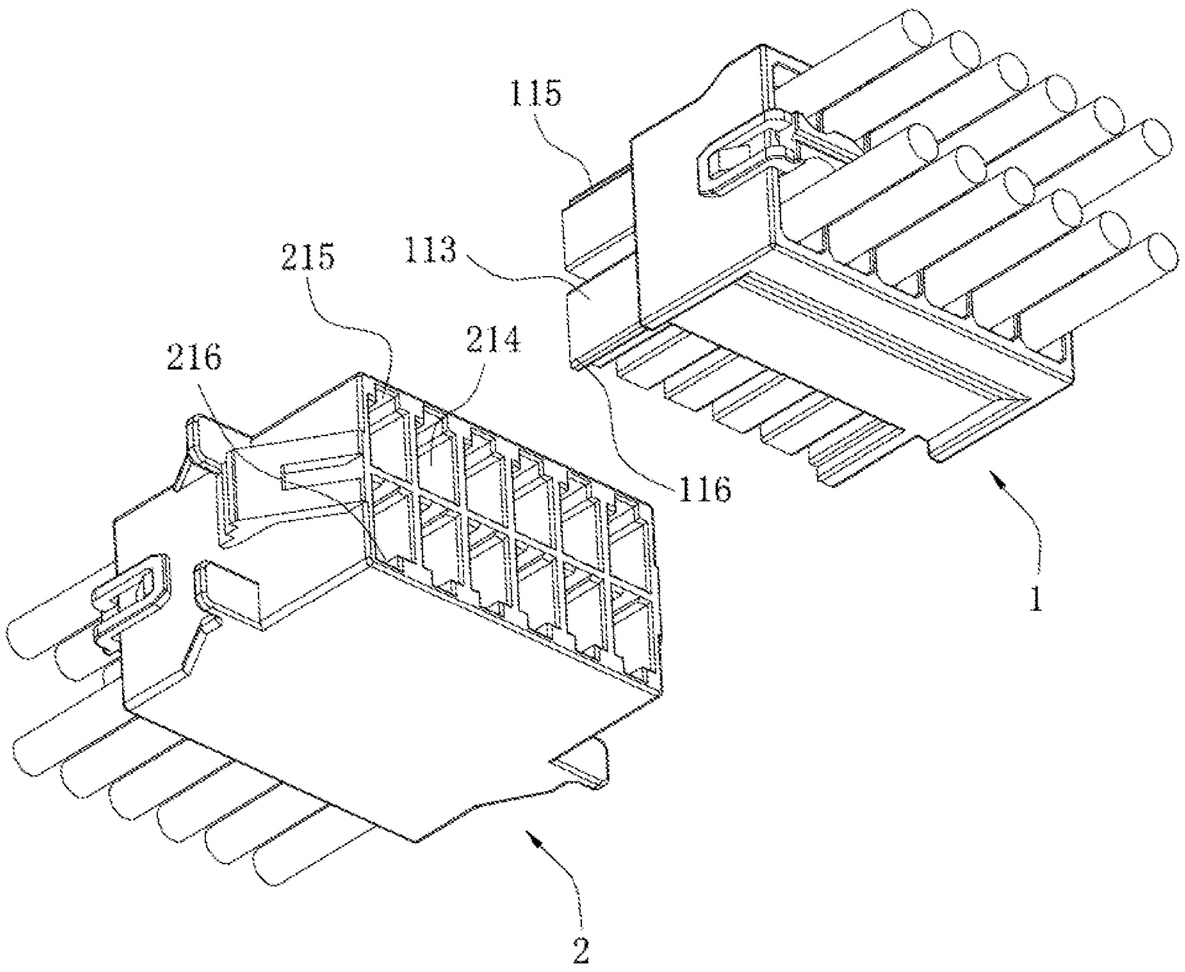

11 first connector housing
111 main body
1111 vertical partitioning board
1112 middle partitioning board
1113 terminal compartment
1114 first latch
1115 first guide protruding rib
1116 rear limiting portion
112 locking mechanism
1121 side locking arm
1122 front locking arm
1123 rear locking arm
113 mating post
1131 first terminal receiving cavity
114 elastic arm
1141 front limiting portion
115 first prevent mis-insertion protruding rib
1152 slot
116 second prevent mis-insertion protruding rib
117 covering portion
1171 side covering board
1172 upper covering board
12 first conductive terminal
121 first mating portion
1211 mating space
1212 front frame
1213 rear frame
12131 limiting protrusion
1214 fixed contacting piece
12141 auxiliary contact point
1215 elastic contacting piece
12151 main contact point
122 first tail portion
1221 front clamping piece
1222 rear clamping piece
123 first connecting portion
1231 connection piece
1232 first limiting piece
13 first terminal position assurance component
131 first base portion
1311 first recessed groove
132 first terminal abutting portion
1321 first guiding notch
133 first locking portion
1331 elastic locking arm
1332 latching groove
14 connector position assurance component
141 operating portion
1411 base board
1412 operating board
1413 rib board
142 pressing portion
1421 downward pressing end
143 snapping portion
15 conductive wire
2 second electrical connector
21 second connector housing
211 elastic snapping claw
2111 step stopping face
212 stopping portion
213 locking protrusion
214 second terminal receiving cavity
2141 terminal limiting portion
2142 second guide protruding rib
215 first prevent mis-insertion notch
216 second prevent mis-insertion notch
217 second latch
22 second conductive terminal
221 second mating portion
222 second tail portion
223 second connecting portion
2232 second limiting piece
23 second terminal position assurance component
231 second base portion
2311 second recessed groove
232 second terminal abutting portion
2321 second guiding notch
233 second locking portion
25 conductive wire

DETAILED DESCRIPTION

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

As such, references to a feature are intended to describe a feature of an embodiment of the present disclosure do not to imply that every embodiment thereof must have the described feature. Furthermore, it should be noted that the description illustrates a number of features. While certain features may be combined together to illustrate potential system designs, those features may also be used in other combinations not expressly described. Thus, the described combinations are not intended to be limiting, unless otherwise noted.

In the embodiments illustrated in the figures, representations of directions such as up, down, left, right, front and rear, used for explaining the structure and movement of the various components of the present disclosure, are not absolute, but relative. These representations are appropriate when the components are in the position shown in the figures. If the description of the position of the components changes, however, these representations are to be changed accordingly.

Hereinafter, a preferred embodiment of the present disclosure will be described in detail in combination with the drawings of the present specification.

Referring to FIG. 1 to FIG. 4, a preferred embodiment of the present disclosure provides a first electrical connector 1, a second electrical connector 2 which mates with the first electrical connector 1, and an electrical connector assembly 100 constituted by the first electrical connector 1 and the second electrical connector 2 which mate with each other. The first electrical connector 1 and the second electrical connector 2 are respectively provided with corresponding prevent mis-insertion structure, so as to facilitate correctly mate the first electrical connector 1 and the second electrical connector 2. In addition, a top portion of the first electrical connector 1 is provided with a locking mechanism 112, a top portion of the second electrical connector 2 is provided with a locking protrusion 213, the locking mechanism 112 and the locking protrusion 213 may be locked with each other, so as to strengthen connection between the first electrical connector 1 and the second electrical connector 2. Furthermore, the first electrical connector 1 is provided with a first terminal position assurance component 13, the second electrical connector 2 is provided with a second terminal position assurance component 23, the first terminal position assurance component 13 and the second terminal position assurance component 23 may respectively assure the positions of conductive terminals in the first electrical connector 1 and the positions of conductive terminals in the second electrical connector 2, so as to promote reliability of electrical connection between the first electrical connector 1 and the second electrical connector 2.

Hereinafter the first electrical connector 1 and the second electrical connector 2 are respectively described in specific structure thereof.

For sake of convenient description, herein a direction in which one of the first electrical connector 1 and the second electrical connector 2 mates with the other of the first electrical connector 1 and the second electrical connector 2 is defined as "front", and an opposite direction is "rear".

Firstly, referring to FIG. 5 to FIG. 10, the first electrical connector 1 includes a first connector housing 11, a plurality of first conductive terminals 12 which are inserted into the first connector housing 11, a first terminal position assurance component 13 which abut against the plurality of first conductive terminals 12 from behind, a connector position assurance component 14 which is inserted onto the first connector housing 11, and a plurality of conductive wires 15 which are correspondingly connected to rear ends of the plurality of first conductive terminals 12.

Figure 10:
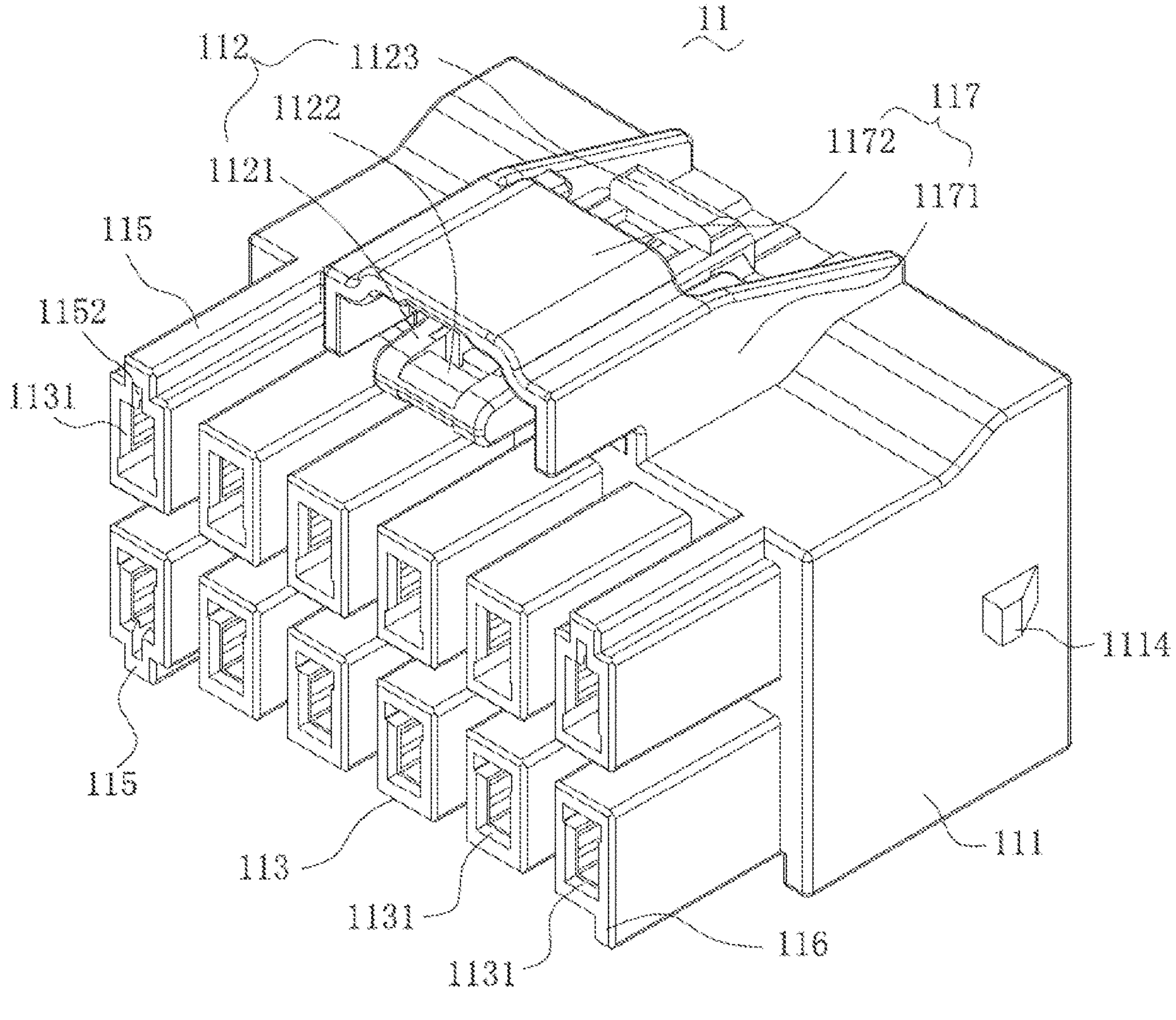
FIG. 10 and FIG. 11 are perspective views of a first connector housing of FIG. 9 from another two different angles.

Referring to FIG. 10, the first connector housing 11 mainly includes a main body 111, the locking mechanism 112 which extends forwardly from an upper surface of the main body 111, and a plurality of mating posts 113 which extend forwardly from a front surface of the main body 111. The first connector housing 11 preferably is a structure integrally formed by an injection molding.

Figure 9:
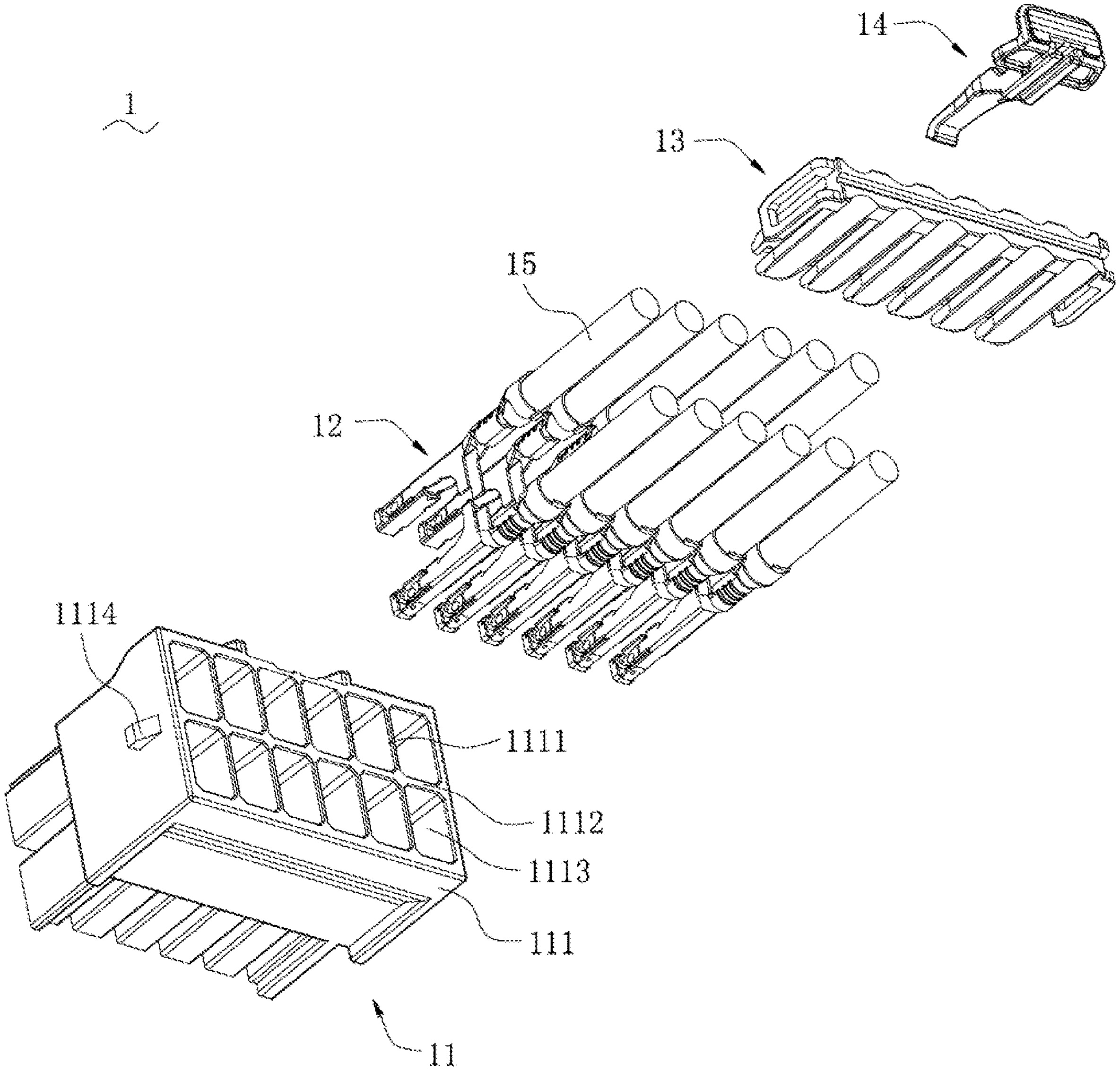
FIG. 9 is a perspective exploded view of the first electrical connector of FIG. 5.
Figure 11:
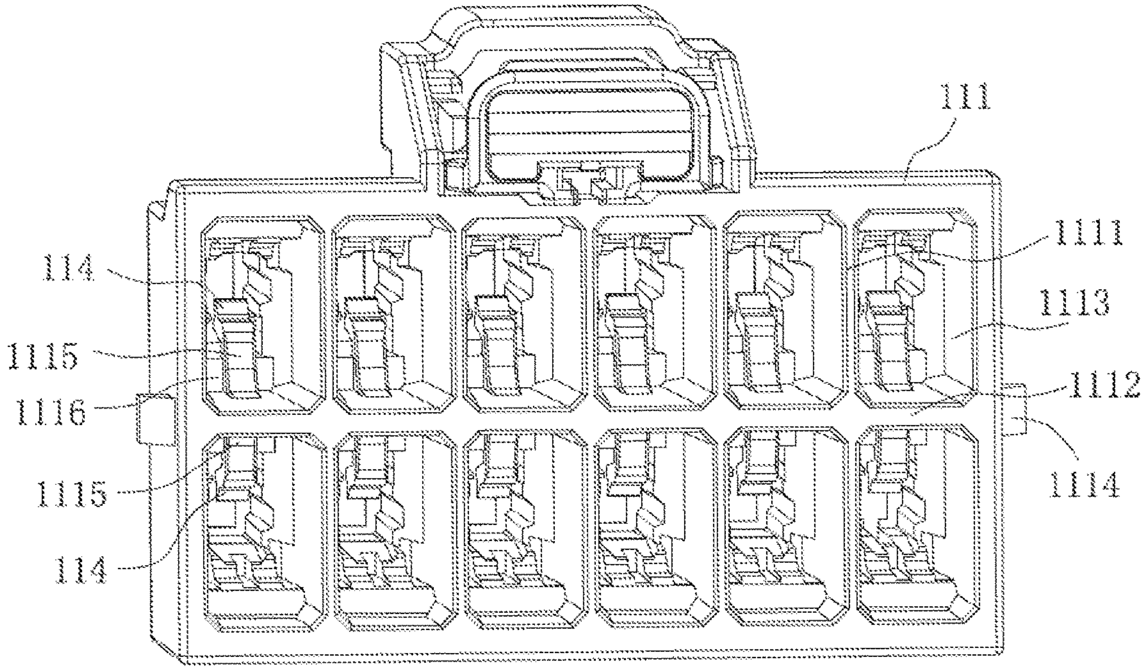
Figure 12:
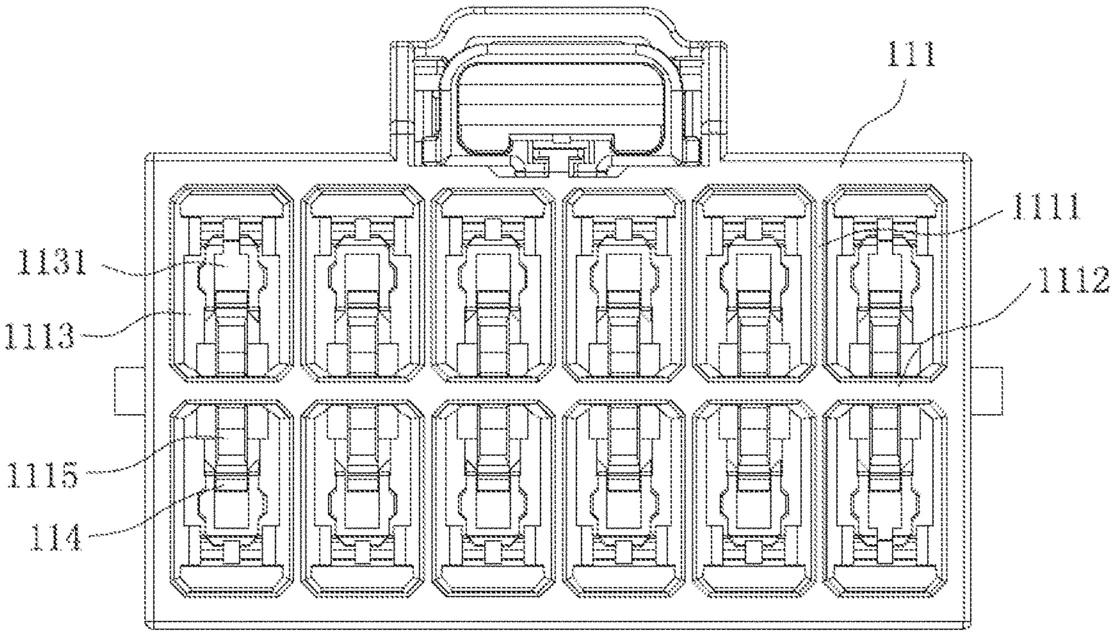
FIG. 12 is a front view of FIG. 11.

Referring to FIG. 9, FIG. 11 and FIG. 12, the main body 111 is substantially hollow rectangular block-shaped, the main body 111 is interiorly provided with a plurality of vertical partitioning boards 1111 which extend in an up-down direction and a middle partitioning board 1112 which are perpendicular to the plurality of vertical partitioning boards 1111 and extend along a transverse direction, so that the main body 111 are interiorly partitioned into a plurality of terminal compartments 1113 which are arranged as an upper row and a lower row, the terminal compartments 1113 in the upper row and the terminal compartments 1113 in the lower row are partitioned by the middle partitioning board 1112. Two side surfaces of the main body 111 further each are provided with a first latch 1114. It is noted that, the first latch 1114 in the preferred embodiment specifically is a latching protrusion which protrudes outwardly, but in some embodiments not shown, the first latch 1114 also may be a latching groove which is recessed inwardly.

Figure 6:
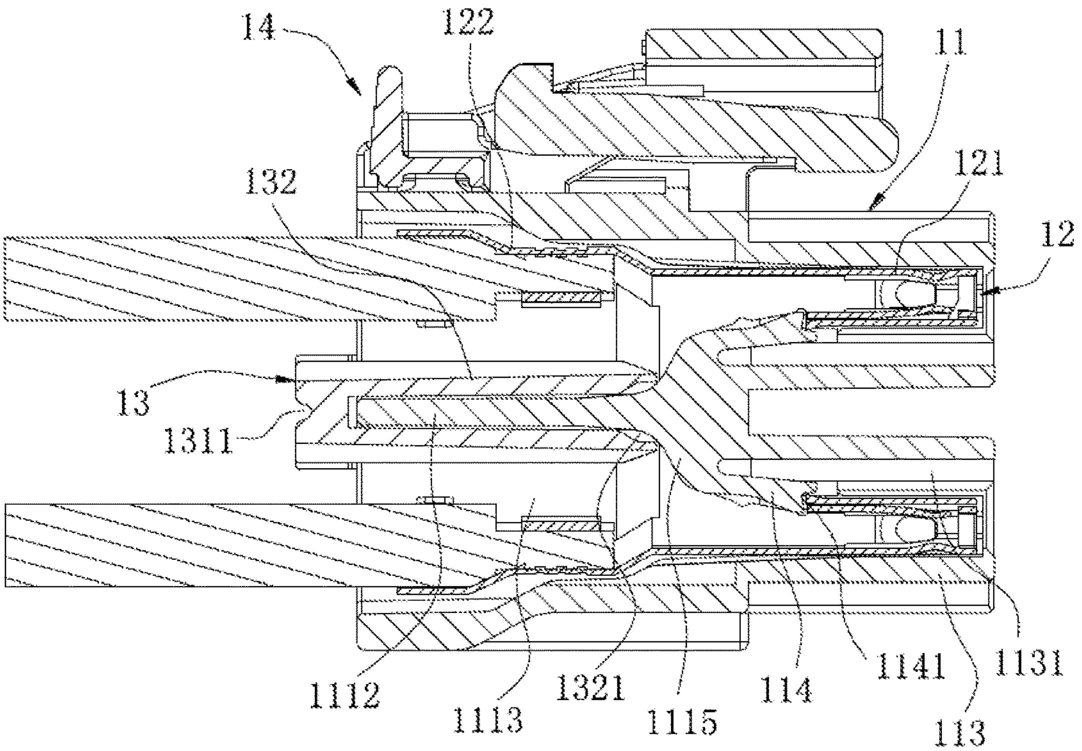
FIG. 6 is a cross sectional view taken along a line A-A of FIG. 5.

Referring to FIG. 6 and FIG. 11, preferably, a first guide protruding rib 1115 protrudes forwardly from a front edge of each terminal compartment 1113 from each of an upper surface and a lower surface of the middle partitioning board 1112. The first guide protruding rib 1115 extend obliquely and forwardly along the up-down direction, the first guide protruding rib 1115 which extends from the upper surface of the middle partitioning board 1112 are gradually obliquely and upwardly away from the middle partitioning board 1112 as the first guide protruding rib 1115 which extends from the upper surface of the middle partitioning board 1112 extends forwardly, the first guide protruding rib 1115 which extends from the lower surface of the middle partitioning board 1112 is gradually obliquely and downwardly away from the middle partitioning board 1112 as the first guide protruding rib 1115 which extends from the lower surface of the middle partitioning board 1112 extends forwardly.

Figure 7:
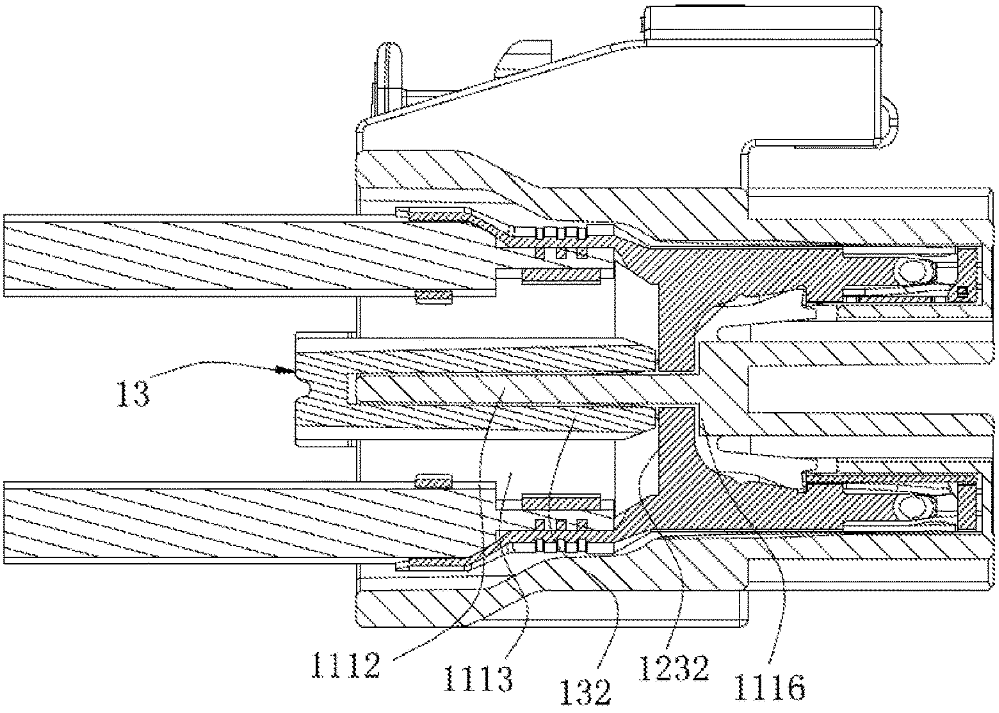
FIG. 7 is a cross sectional view taken along a line B-B of FIG. 5.

In addition, referring to FIG. 7 and FIG. 11, a rear limiting portion 1116 which is step-shaped is formed at each of two sides of the first guide protruding rib 1115 on each of the upper surface and the lower surface of the middle partitioning board 1112 at a front end of the middle partitioning board 1112, the rear limiting portion 1116 protrudes into each terminal compartment 1113.

Referring to FIG. 10, the locking mechanism 112 includes two side locking arms 1121 which are spaced apart from each other, a front locking arm 1122 which is connected between front ends of the two side locking arms 1121, and a rear locking arm 1123 which is connected to rear ends of the two side locking arms 1121. The side locking arm 1121 protrudes from the upper surface of the main body 111 and extends forwardly, the side locking arm 1121 extends forwardly to above the plurality of mating posts 113, and has a spacing with the plurality of mating posts 113 in the up-down direction, a front end of the side locking arm 1121 is positioned behind front end of the plurality of mating posts 113. The front locking arm 1122 is used to correspondingly lock with the locking protrusion 213 of the second electrical connector 2 which mates with the first electrical connector 1. The rear locking arm 1123 has a spacing with the upper surface of the main body 111 to allow the connector position assurance component 14 to insert into the locking mechanism 112.

In the preferred embodiment, a covering portion 117 is further provided around the locking mechanism 112 of the first connector housing 11 from outside, may prevent an operator from unintentionally touching the locking mechanism 112 and the connector position assurance component 14. Specifically, the covering portion 117 includes two side covering boards 1171 which are spaced apart from each other and an upper covering board 1172 which is connected to upper ends of the two side covering boards 1171. The two side covering boards 1171 are erected on the upper surface of the main body 111, the two side covering boards 1171 are positioned at two sides of the locking mechanism 112 respectively and surround the locking mechanism 112 therein. Front ends of the upper covering board 1172 are flush with front ends of the two side covering boards 1171, a front-rear extension length of the upper covering board 1172 is less than a front-rear extension length of the side covering board 1171, the upper covering board 1172 covers the front locking arm 1122 of the locking mechanism 112 from above, but the rear locking arm 1123 is exposed outside a covering range of the upper covering board 1172.

Referring to FIG. 6, FIG. 10 to FIG. 12, the plurality of mating posts 113 are arranged as an upper row and a lower row, and are provided corresponding to the plurality of terminal compartments (terminal rear receiving cavities) 1113 of the main body 111 one-to-one. Each mating post 113 extends forwardly from a front surface of the corresponding terminal compartment 1113, each mating post 113 is interiorly formed with a first terminal receiving cavity (terminal front receiving cavity) 1131 which penetrates in the front-rear direction, the first terminal receiving cavity 1131 is communicated with the corresponding terminal compartment 1113, wherein the terminal front receiving cavity 1131 and the terminal rear receiving cavity 1113 combine with each other to constitute a complete terminal receiving cavity which is used to receive the first conductive terminal 12 therein. The first terminal receiving cavity 1131 has an opening which is formed to a front surface of the mating post 113 and is substantially rectangular.

Preferably, each mating post 113 further is interiorly provided with an elastic arm 114, the elastic arm 114 extends from a front end of the corresponding first guide protruding rib 1115 into the corresponding first terminal receiving cavity 1131, the elastic arm 114 is cantilevered in the corresponding first terminal receiving cavity 1131 and has a spacing with an inner wall of the corresponding mating post 113. A surface of a front end of the elastic arm 114 away from the middle partitioning board 1112 is provided with a notch which forms a front limiting portion 1141.

FIG. 10 exemplarily illustrates that the number of the mating posts 113 in each row in the preferred embodiment is six. But it is may be understood that, in other embodiments not shown, the number of the mating posts 113 in each row may be provided as desired.

In the preferred embodiment, in the six mating posts 113 of the upper row, a first prevent mis-insertion protruding rib 115 protrudes upwardly from each of the mating post 113 positioned at the leftmost and the mating post 113 positioned at the rightmost. The first prevent mis-insertion protruding rib 115 substantially is a hollow rectangular door-shaped structure, a slot 1152 is formed at a position where the first prevent mis-insertion protruding rib 115 is connected with the mating post 113, and the slot 1152 is communicated with the first terminal receiving cavity 1131, the slot 1152 forms a notch on a front surface of the mating post 113, so that the slot 1152 and the first terminal receiving cavity 1131 together constitute an opening, which is substantially inversed T-shaped, at the front surface of the mating post 113. During injection molding of the first connector housing 11, the slot 1152 may attain an effect to maintain a wall thickness of the first connector housing 11 uniform so as to prevent improper deformation of the first connector housing 11 from occurring and save material. The first prevent mis-insertion protruding rib 115 protrudes upwardly from a middle portion of an upper surface of the mating post 113, an outer contour of the first prevent mis-insertion protruding rib 115 is elongated, and a width of the first prevent mis-insertion protruding rib 115 is smaller than a width of the mating post 113, a combination of the first prevent mis-insertion protruding rib 115 and the mating post 113 forms a structure having an outer contour which is substantially inversed T-shaped.

In the six mating post 113 of the lower row, a first prevent mis-insertion protruding rib 115 protrudes downwardly from a middle portion of the mating post 113 positioned at the rightmost, a combination of the first prevent mis-insertion protruding rib 115 and the mating post 113 forms a structure having an outer contour which is substantially inversed T-shaped. A second prevent mis-insertion protruding rib 116 protrudes downwardly from a lower surface of a side edge of the mating post 113 positioned at the leftmost, the second prevent mis-insertion protruding rib 116 is solid piece-shaped, an outer side surface of the second prevent mis-insertion protruding rib 116 is flush with an outer side surface of the mating post 113. A width of the second prevent mis-insertion protruding rib 116 is smaller than a width of the mating post 113.

The first prevent mis-insertion protruding ribs 115 and the second prevent mis-insertion protruding rib 116 associated with the corresponding mating posts 113 cooperate with each other to form a set of a prevent mis-insertion assembly which only allows the first electrical connector 1 having the prevent mis-insertion assembly to be correctly mated a with the second electrical connector 2 having a corresponding prevent mis-insertion assembly.

In practical application, with respect to a plurality of first electrical connectors 1 which have similar outer profiles but realize different electrical functions, the plurality of first electrical connectors 1 may be distinguished by being provided with different prevent mis-insertion assemblies. Here, "similar outer profiles" may be understood that they are the same in the number of the mating posts 113 and they are similar in an arrangement manner of the plurality of mating posts 113. The prevent mis-insertion assembly is constituted by the first prevent mis-insertion protruding rib 115 which protrudes from a middle portion of at least one of the plurality of mating posts 113 and the second prevent mis-insertion protruding rib 116 which protrudes from a side edge of at least one of the plurality of mating posts 113, by that the first prevent mis-insertion protruding rib 115 and the second prevent mis-insertion protruding rib 116 are selectively provided on the plurality of mating posts 113, various particular first electrical connectors 1 having different prevent mis-insertion assemblies may be formed.

For example, on a basis of the structure of the preferred embodiment, the first prevent mis-insertion protruding rib 115 is modified to protrude from a middle portion of one or middle portions of more than one of the plurality of mating posts 113 which is/are positioned in a middle of the plurality of mating posts 113, or the second prevent mis-insertion protruding rib 116 is modified to protrude from another side edge of the corresponding mating post 113, or the second prevent mis-insertion protruding rib 116 is modified to protrude from a side edge of one or side edges of more than one of the other of the plurality of mating posts 113, and so on, by these modifications, a first electrical connector 1 having its own particular prevent mis-insertion assembly may be formed. Because the first prevent mis-insertion protruding rib 115 and the second prevent mis-insertion protruding rib 116 are provided on the different mating posts 113, any two electrical connectors having different prevent mis-insertion assemblies cannot mate with each other, so that mis-insertion may be prevented from occurring.

With respect to a case that the plurality of mating posts 113 are provided as the upper row and the lower row in the preferred embodiment, preferably, the first prevent mis-insertion protruding rib 115 and the second prevent mis-insertion protruding rib 116 provided to the mating posts 113 in the upper row each protrude upwardly from the upper surface of the corresponding mating post 113, the first prevent mis-insertion protruding rib 115 and the second prevent mis-insertion protruding rib 116 provided to the mating posts 113 in the lower row each protrude downwardly from the lower surface of the corresponding mating post 113. That is to say, the first prevent mis-insertion protruding rib 115 and the second prevent mis-insertion protruding rib 116 provided to the mating posts 113 in the upper row and the first prevent mis-insertion protruding rib 115 and the second prevent mis-insertion protruding rib 116 provided to the mating posts 113 in the lower row are provided away from each other in the up-down direction.

Figure 13:
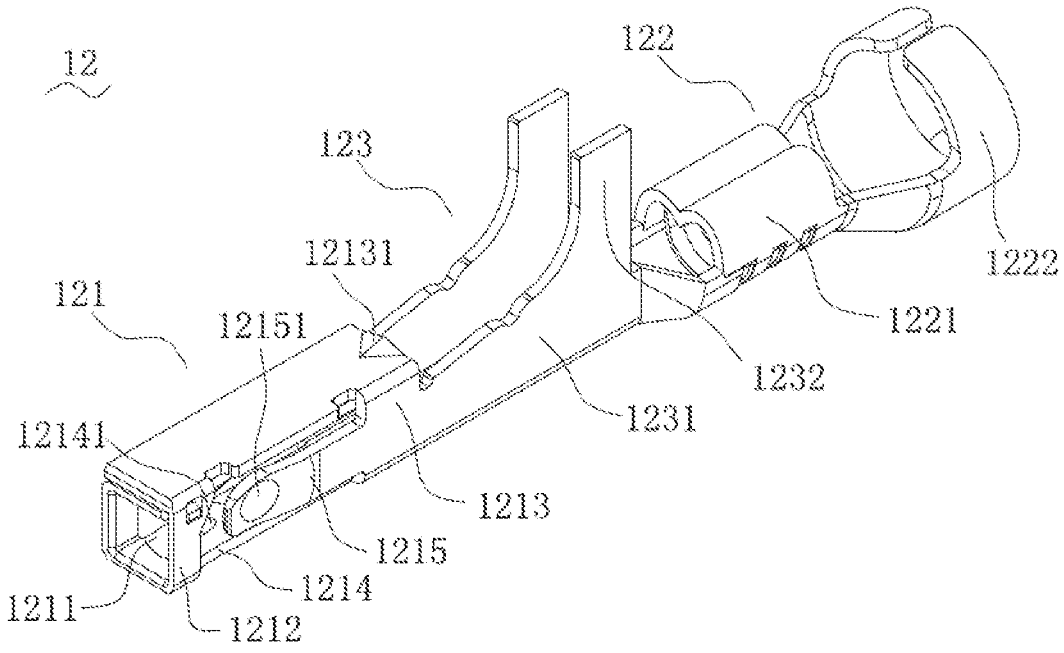
FIG. 13 is a perspective view of a first conductive terminal of FIG. 9 from another angle.

Referring to FIG. 13, the plurality of first conductive terminals 12 may be formed by stamping a metal plate. Each first conductive terminal 12 includes a first mating portion 121, a first tail portion 122 positioned behind the first mating portion 121, and a first connecting portion 123 connected between the first mating portion 121 and the first tail portion 122.

The first mating portion 121 interiorly has a mating space 1211 surrounded therein, the first mating portion 121 includes a front frame 1212, a rear frame 1213 behind positioned the front frame 1212, two fixed contacting pieces 1214 connecting the front frame 1212 and the rear frame 1213 and facing each other, and two elastic contacting pieces 1215 extending from the rear frame 1213 toward the front frame 1212 and facing each other. The front frame 1212 and the rear frame 1213 each are substantially square, which is surrounded by a plate material. A limiting protrusion 12131 is provided to one of side surfaces of the rear frame 1213, the limiting protrusion 12131 protrudes away from the mating space 1211.

A front end of the elastic contacting piece 1215 is a free end and has a spacing with the front frame 1212. A main contact point 12151 protrudes from the front end of each elastic contacting piece 1215 into the mating space 1211. An auxiliary contact point 12141 protrudes from a front end of each fixed contacting piece 1214 into the mating space 1211, the auxiliary contact point 12141 is positioned in front of the main contact point 12151. By provision of the main contact point 12151 and the auxiliary contact point 12141, hot plugging property and contact property of the first conductive terminal 12 may be promoted.

The first tail portion 122 is used to clamp the conductive wire 15, includes a front clamping piece 1221 which is used to clamp an interior conductor of the conductive wire 15 and a rear clamping piece 1222 which is used to clamp an exterior insulator of the conductive wire 15.

The first connecting portion 123 has two connection pieces 1231 which are spaced apart from each other and face each other, two ends of the connection piece 1231 are respectively connected to the first mating portion 121 and the first tail portion 122. A first limiting piece 1232 protrudes from a rear end of the connection piece 1231 along the up-down direction.

In combination with FIG. 6 and FIG. 7, the plurality of first conductive terminals 12 correspondingly insert into the plurality of mating posts 113 one-to-one. The first mating portion 121 of each first conductive terminal 12 is received in the corresponding first terminal receiving cavity 1131, the first tail portion 122 is received in the corresponding terminal compartment 1113.

The first conductive terminal 12 is mounted into the first connector housing 11 from the rear to the front, here, the first limiting piece 1232 of the first connecting portion 123 may abut against the corresponding rear limiting portion 1116 of the corresponding the mating post 113, so as to prevent the first conductive terminal 12 from excessively forwardly entering into the first connector housing 11. In a process that the first mating portion 121 forwardly enters into the corresponding mating post 113 of the first mating portion 121, when the first mating portion 121 contacts the elastic arm 114, the first mating portion 121 applies a force to the elastic arm 114 to force the elastic arm 114 to elastically deform, after the first mating portion 121 reaches a position in front of the elastic arm 114, the elastic arm 114 elastically restores to make the front limiting portion 1141 stop the first mating portion 121 from behind, so as to prevent the first conductive terminal 12 from being detached rearwardly from the first connector housing 11.

In addition, the limiting protrusion 12131 of the first mating portion 121 further abuts against a side surface of the front limiting portion 1141, so that there is a small gap between a surface of the rear frame 1213 and the front limiting portion 1141 in the up-down direction, by that a needle-shaped detaching tool may insert into the small gap and press the elastic arm 114, so that stopping of the elastic arm 114 to the first mating portion 121 may be released, at this time the first conductive terminal 12 may withdraw rearwardly from the first connector housing 11, so as to facilitate maintenance of the first conductive terminal 12 when the first conductive terminal 12 generates a problem.

Figure 14:
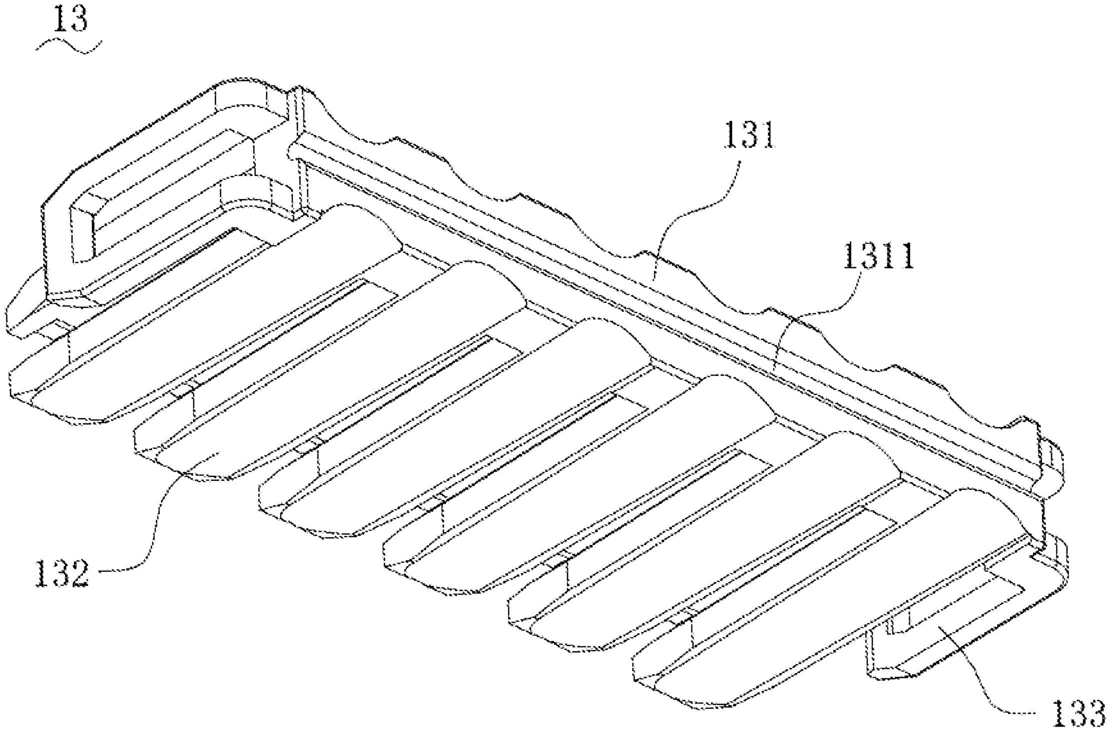
FIG. 14 and FIG. 15 are perspective views of a first terminal position assurance component of FIG. 9 from two different angles.
Figure 15:
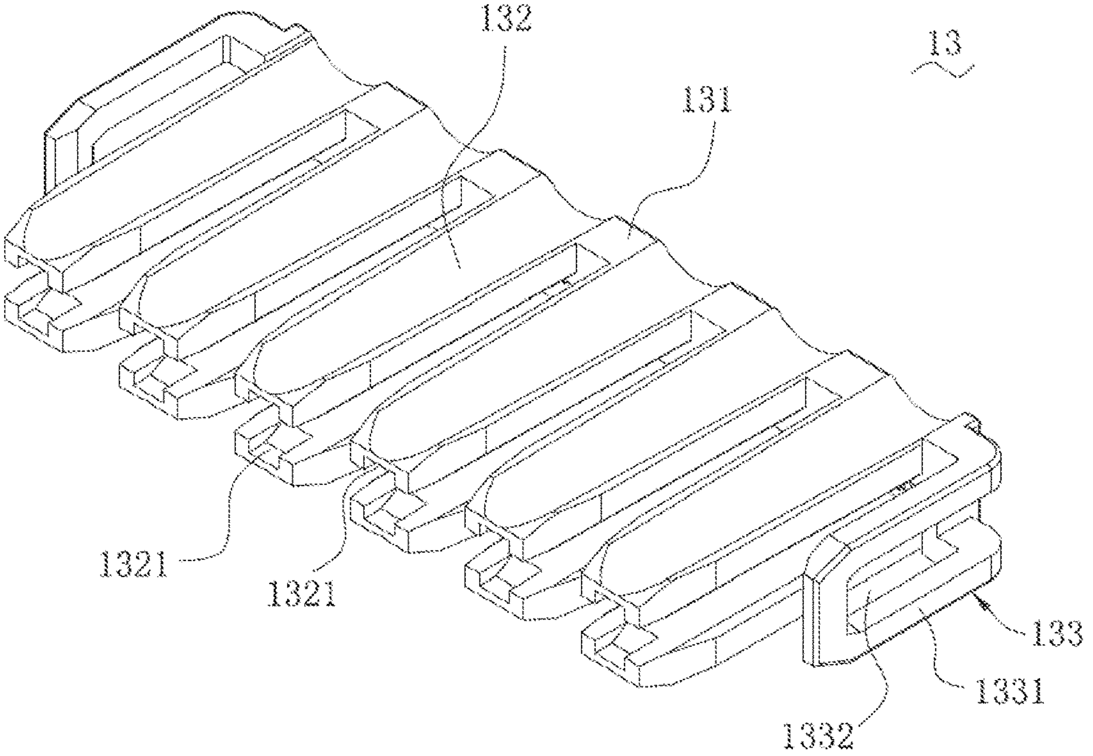

Referring to FIG. 14 and FIG. 15, the first terminal position assurance component 13 includes a first base portion 131, a plurality of first terminal abutting portions 132 which respectively extend forwardly from an upper side edge and a lower side edge of the first base portion 131, and two first locking portions 133 which respectively extend forwardly from a left side and a right side of the first base portion 131.

A recessed groove 1311 is formed on a rear surface of the first base portion 131 and extends along a transverse direction (that is along an arrangement direction of the plurality of first terminal abutting portion 132), the recessed groove 1311 penetrates a left side edge and a right side edge of the first base portion 131, the recessed groove 1311 is substantially positioned at a center of the first base portion 131 in the up-down direction.

The plurality of first terminal abutting portions 132 are arranged as an upper row and a lower row which are arranged respectively along the upper side edge and the lower side edge of the first base portion 131, are spaced apart from each other and are symmetric relative to each other. A first guiding notch 1321 is provided at a center of a front end of the first terminal abutting portion 132, every two first terminal abutting portions 132 which face each other in the up-down direction make the two first guiding notches 1321 thereof face each other. That is, a lower surface of the first terminal abutting portion 132 positioned in the upper row is provided with the first guiding notch 1321, an upper surface of the first terminal abutting portion 132 positioned in the lower row also is provided with the first guiding notch 1321.

The two first locking portions 133 are positioned at two sides of the plurality of first terminal abutting portions 132, and are spaced apart from the plurality of first terminal abutting portions 132. It is noted that, the first locking portion 133 in the preferred embodiment specifically is an elastic locking arm 1331 which is provided with a latching groove 1332 at a middle portion of the elastic locking arm 1331, but in some embodiments not shown, the first locking portion 133 also may be an elastic locking arm from which a latching hook protrudes inwardly.

Figure 5:
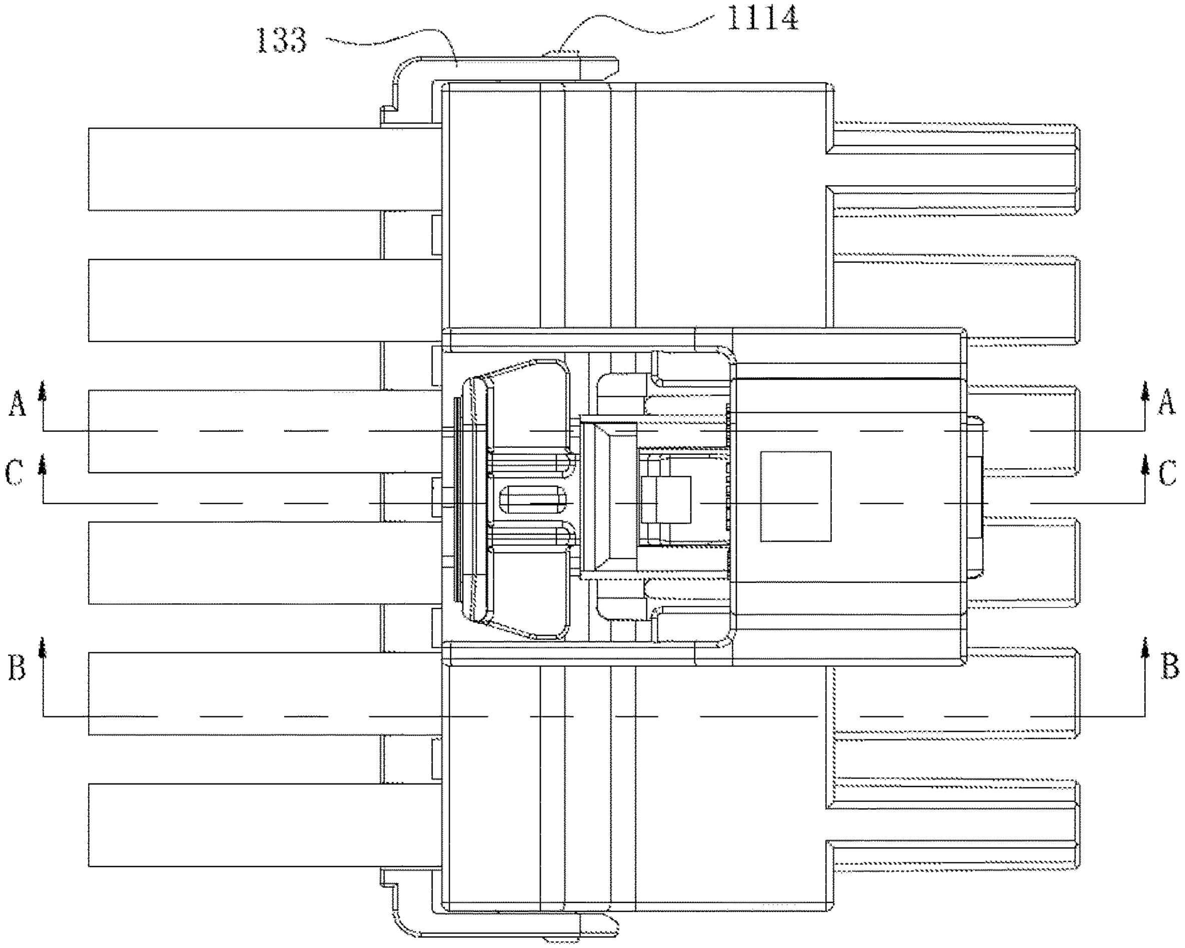
FIG. 5 is a top view of a first electrical connector of FIG. 1.

Further in combination with FIG. 5 to FIG. 7, the first terminal position assurance component 13 is mounted to a rear end of the first connector housing 11. The two first locking portions 133 and the two first latches 1114 on the main body 111 are locked with each other, so that the first terminal position assurance component 13 is fixed on the first connector housing 11. An arrangement of the plurality of first terminal abutting portions 132 corresponds to an arrangement of the plurality of terminal compartments 1113 in the main body 111, each first terminal abutting portion 132 enters into the corresponding terminal compartment 1113, the first guiding notch 1321 and the first guide protruding rib 1115 cooperate with each other, so as to facilitate that the first terminal abutting portion 132 is align with the two first limiting pieces 1232 of the first conductive terminal 12, is inserted into the corresponding terminal compartment 1113 and abuts against the two first limiting pieces 1232 of the first conductive terminal 12 from behind. The first terminal position assurance component 13 forwardly abuts against the first conductive terminal 12, which may prevent the first conductive terminal 12 from withdrawing rearwardly, effectively resist a mating acting force subjected by the first conductive terminal 12 when the first conductive terminal 12 mates with the second conductive terminal 22, assure that a position of the first conductive terminal 12 does not change, promote reliability of the mating between the first conductive terminal 12 and the second conductive terminal 22.

Furthermore, the recessed groove 1311 of the first base portion 131 promotes elasticity of the first terminal position assurance component 13, is beneficial for the first terminal abutting portions 132 arranged in the upper row and the first terminal abutting portions 132 arranged in the lower row to splay, which may increase an interval between the first terminal abutting portions 132 in the upper row and the first terminal abutting portions 132 in the lower row, so as to facilitate that the plurality of first terminal abutting portions 132 smoothly insert into the plurality of terminal compartments 1113 of the main body 111 respectively.

Moreover, after the first terminal abutting portion 132 is inserted in place, the first terminal abutting portions 132 arranged in the upper row and the first terminal abutting portions 132 arranged in the lower row which are symmetric clamp the middle partitioning board 1112 from an upper side and a lower side of the middle partitioning board 1112, which may increase a friction force between the plurality of first terminal abutting portions 132 and the middle partitioning board 1112, in turn make the first terminal position assurance component 13 not easily fall off from the middle partitioning board 1112.

Figure 16:
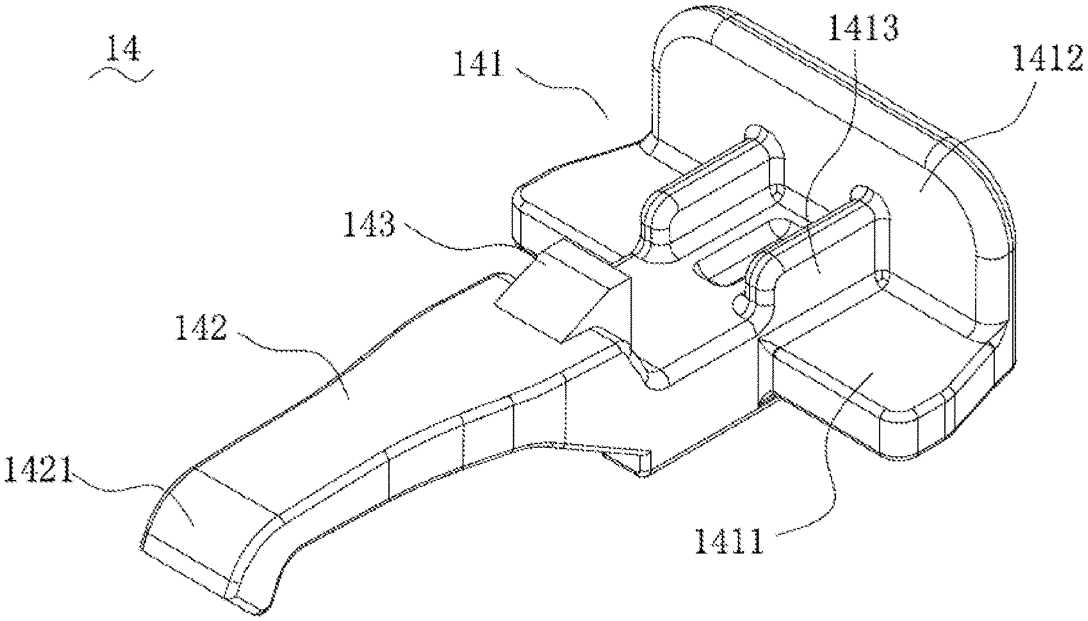
FIG. 16 is a perspective view of a connector position assurance component of FIG. 9 from another angle.

Referring to FIG. 16, the connector position assurance component 14 includes an operating portion 141, a pressing portion 142 which protrudes forwardly from the operating portion 141, and a snapping portion 143 which protrudes upwardly from the pressing portion 142. The operating portion 141 includes a base board 1411, an operating board 1412 which extends upwardly from a rear end of the base board 1411, and a plurality of rib boards 1413 which are connected between the base board 1411 and the operating board 1412. The pressing portion 142 extends forwardly from a front end of the base board 1411, a front end of the pressing portion 142 forms a downward pressing end 1421 which extends downwardly and forwardly. The snapping portion 143 is positioned at a rear end of the pressing portion 142, and protrudes upwardly from an upper surface of the pressing portion 142.

Figure 8:
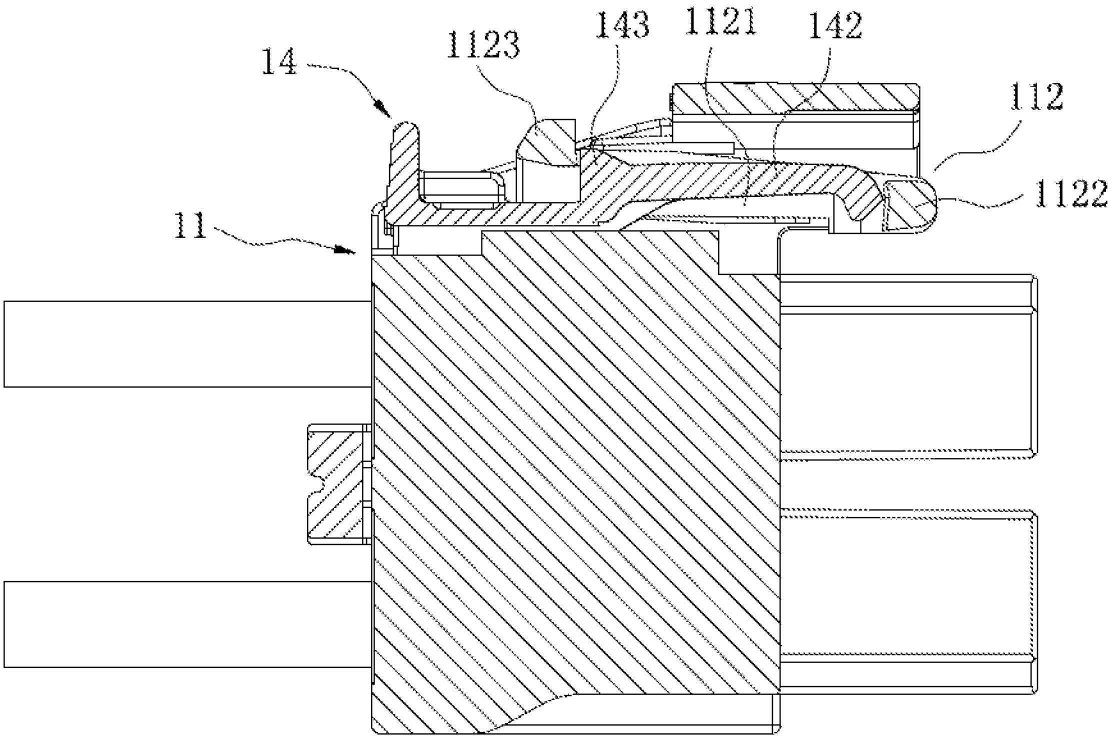
FIG. 8 is a cross sectional view taken along a line C-C of FIG. 5.

In combination with FIG. 8, the connector position assurance component 14 may be mounted into the locking mechanism 112 from behind the first connector housing 11, the pressing portion 142 enters into between the two side locking arms 1121 from below the rear locking arm 1123, the snapping portion 143 snaps the rear locking arm 1123 from front to prevent the connector position assurance component 14 from being detached rearwardly from the locking mechanism 112. The downward pressing end 1421 at the front end of the pressing portion 142 may press downwardly on the locking protrusion 213 of the second electrical connector 2 which mates with the first electrical connector 1, to prevent locking between the front locking arm 1122 and the locking protrusion 213 from being released, further strengthen connection between the first electrical connector 1 and the second electrical connector 2.

Then referring to FIG. 17 to FIG. 20, the second electrical connector 2 includes a second connector housing 21, a plurality of second conductive terminals 22 inserted into the second connector housing 21, and a second terminal position assurance component 23 abutting against the plurality of second conductive terminals 22. The locking protrusion 213 protrudes from an upper surface of the second connector housing 21, and is used to lock with the first electrical connector 1.

Figure 20:
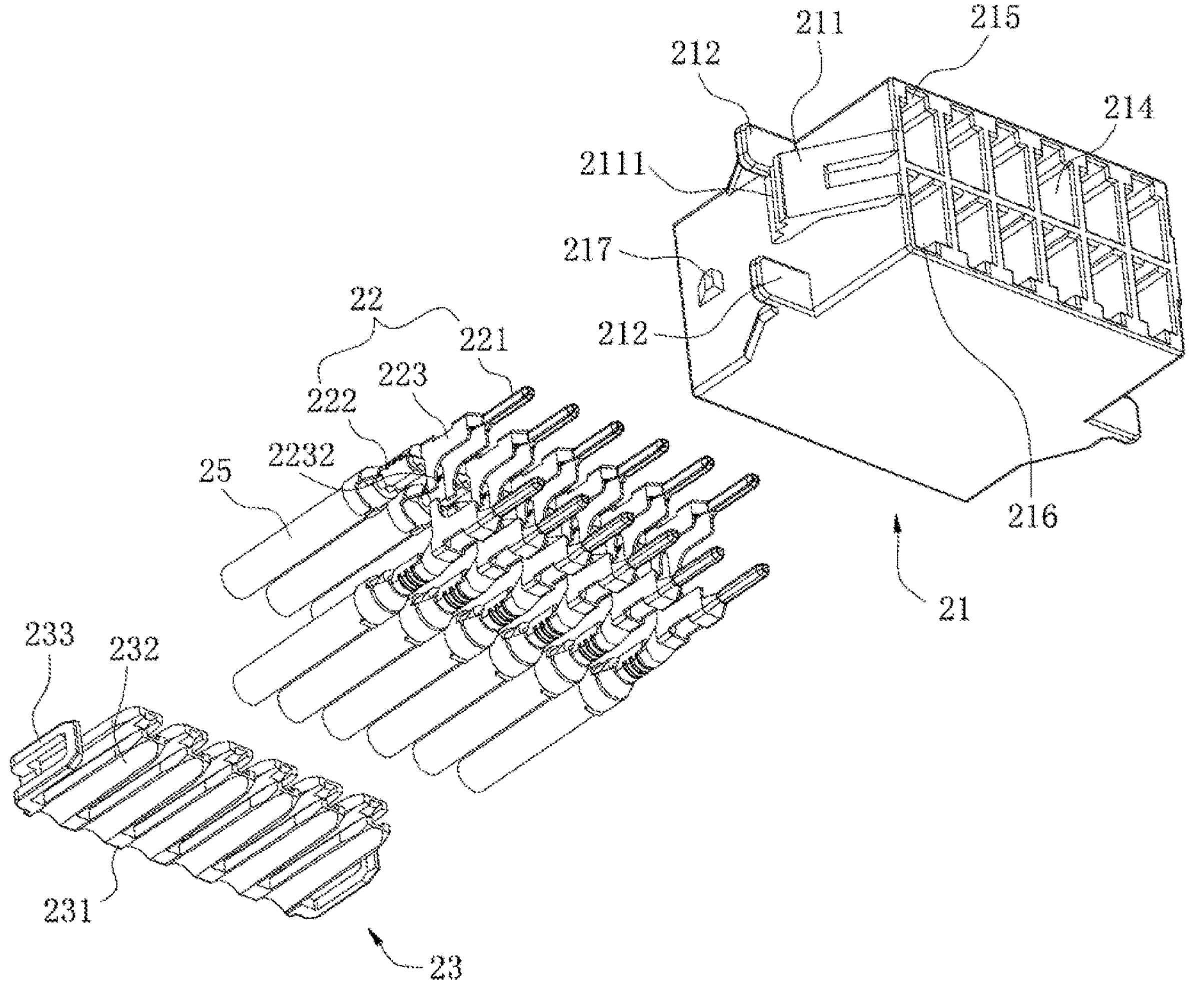
FIG. 20 is a perspective exploded view of the second electrical connector of FIG. 17.

Referring to FIG. 20, a main body structure of the second connector housing 21 is substantially rectangular, two side surfaces of the main body structure respectively each are provided with an elastic snapping claw 211 which obliquely extends rearwardly and two stopping portions 212 which are respectively positioned at an upper side and a lower side of the elastic snapping claw 211. The elastic snapping claw 211 obliquely extends rearwardly from a front end of the second connector housing 21, is elastically cantilevered to each of the two side surfaces of the second connector housing 21, the two elastic latching claws 211 are used to snap the second connector housing 21 onto a panel of an electronic device, which facilitates mounting of the second electrical connector 2 in the electronic device. Preferably, an outer surface of a rear end of the elastic snapping claw 211 is provided with a plurality of step stopping faces 2111, the different step stopping faces 2111 may correspondingly snap into through holes of the panel which have different sizes, which thus is beneficial to promote universality of the second electrical connector 2. The stopping portion 212 is flat board-shaped, is provided corresponding to the rear end of the elastic snapping claw 211, may prevent an operator from unintentionally touching the elastic snapping claw 211. In addition, rear ends of the two side surfaces of the second connector housing 21 further each are provided with a second latch 217. The second latch 217 in the preferred embodiment specifically is a latching protrusion which protrudes outwardly, but in some embodiments not shown, the second latch 217 also may be a latching groove which is recessed inwardly.

A plurality of second terminal receiving cavities 214 are recessed from a front surface of the second connector housing 21, the plurality of second terminal receiving cavities 214 rearwardly penetrate a rear surface of the second connector housing 21. Corresponding to the plurality of mating posts 113 of the first connector housing 11, the plurality of second terminal receiving cavities 214 are arranged as an upper row and a lower row, each of the upper row and the lower row is constituted by the six second terminal receiving cavities 214.

A first prevent mis-insertion notch 215 recessed upwardly from a middle portion of an upper wall of each of the six second terminal receiving cavities 214 in the upper row, a width of the first prevent mis-insertion notch 215 is less than a width of the corresponding second terminal receiving cavity 214, a combination of the first prevent mis-insertion notch 215 and the second terminal receiving cavity 214 forms a structure whose cross section is substantially inversed T-shaped. A second prevent mis-insertion notch 216 is recessed downwardly from a side of a lower wall of the second terminal receiving cavity 214 at the rightmost in the lower row, a width of the second prevent mis-insertion notch 216 is less than a width of the corresponding second terminal receiving cavity 214, and a side wall of the second prevent mis-insertion notch 216 is flush with a side wall of the corresponding second terminal receiving cavity 214. The first prevent mis-insertion notch 215 also is recessed downwardly from a middle portion of a lower wall of each of the other five second terminal receiving cavities 214 in the lower row, and a combination of the first prevent mis-insertion notch 215 and the corresponding second terminal receiving cavity 214 forms a structure whose cross section is substantially T-shaped.

The first prevent mis-insertion notches 215 and the second prevent mis-insertion notch 216 form a prevent mis-insertion assembly which facilitates correct mating of the second electrical connector 2 with the first electrical connector 1 having the corresponding prevent mis-insertion assembly. The first prevent mis-insertion notches 215 and the second prevent mis-insertion notch 216 may be selectively provided to different second terminal receiving cavities 214, so that the first prevent mis-insertion notches 215 and the second prevent mis-insertion notch 216 combine with each other to form various different prevent mis-insertion assemblies.

With respect to the case that the plurality of second terminal receiving cavities 214 are provided as the upper row and the lower row in the preferred embodiment, preferably, the first prevent mis-insertion notch 215 and the second prevent mis-insertion notch 216 provided to the second terminal receiving cavities 214 in the upper row each are recessed upwardly from the upper wall of the corresponding second terminal receiving cavity 214, the first prevent mis-insertion notch 215 and the second prevent mis-insertion notch 216 provided to the second terminal receiving cavities 214 in the lower row each are recessed downwardly from the lower wall of the corresponding second terminal receiving cavity 214. That is to say, the first prevent mis-insertion notch 215 and the second prevent mis-insertion notch 216 provided to the second terminal receiving cavities 214 in the upper row and the first prevent mis-insertion notch 215 and the second prevent mis-insertion notch 216 provided to second terminal receiving cavities 214 in the lower row are provided away from each other in up-down direction.

Still referring to FIG. 20, the plurality of second conductive terminals 22 are formed by stamping a metal board. The second conductive terminal 22 includes a second mating portion 221, a second tail portion 222 positioned behind the second mating portion 221, and a second connecting portion 223 connected between the second mating portion 221 and the second tail portion 222.

The second mating portion 221 is used to mate with the first mating portion 121 of the first electrical connector 1, the second mating portion 221 may be formed as a hollow needle-shaped structure surrounded by a plate material through stamping, so that the second mating portion 221 can insert into the mating space 1211 of the corresponding first mating portion 121.

The second tail portion 222 is connected with a conductive wire 25, a structure of the second tail portion 222 is similar to the structure of the first tail portion 122 and is not repeatedly described herein. A structure of the second connecting portion 223 is also substantially similar to the structure of the first connecting portion 123. Here, the second connecting portion 223 has second limiting pieces 2232 which each protrude along the up-down direction.

Figure 18:
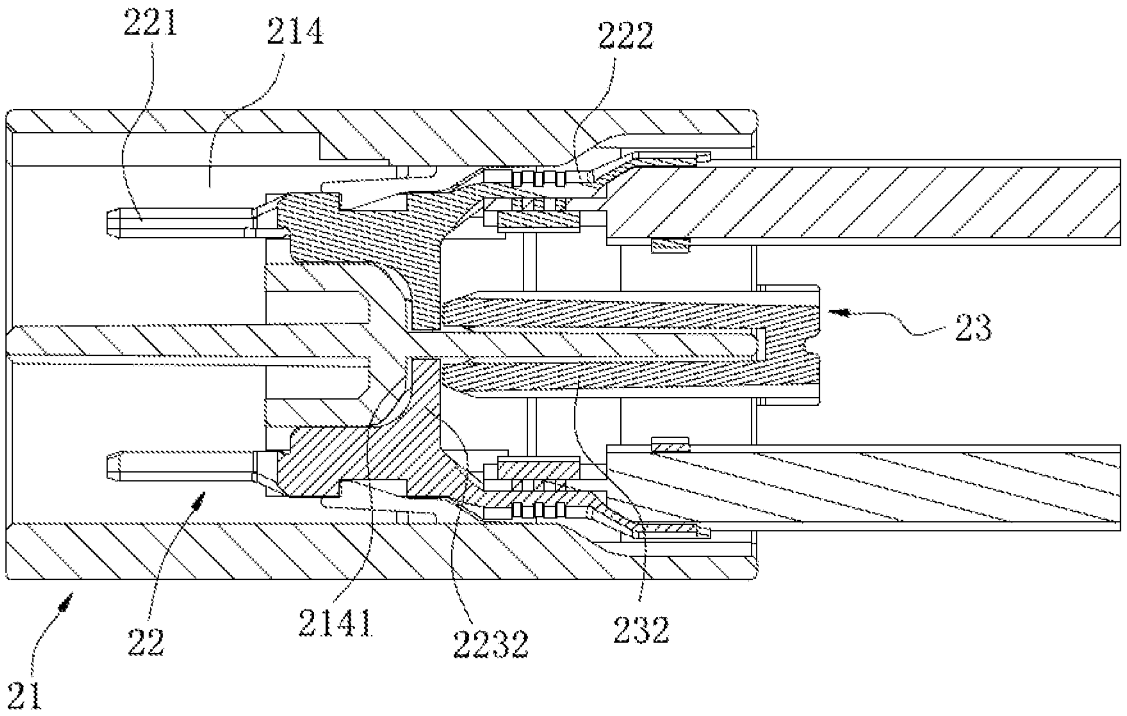
FIG. 18 is a cross sectional view taken along a line D-D of FIG. 17.

In combination with FIG. 18, the second conductive terminal 22 is received in the second connector housing 21, the second mating portion 221 is inserted into a front end of the corresponding second terminal receiving cavity 214, the second tail portion 222 is positioned in a rear end of the corresponding second terminal receiving cavity 214. The second conductive terminal 22 preferably is mounted into the second connector housing 21 from the rear to the front, here, a terminal limiting portion 2141 protrudes into the second terminal receiving cavity 214, the terminal limiting portion 2141 stops the second limiting piece 2232 of the second connecting portion 223 from the front to limit a position of the second conductive terminal 22 where the second conductive terminal 22 is inserted forwardly.

Referring to FIG. 20, a structure of the second terminal position assurance component 23 is the same as the structure of the first terminal position assurance component 13, includes a second base portion 231, a plurality of second terminal abutting portions 232 which respectively extend forwardly from an upper side edge and a lower side edge of the second base portion 231, and two second locking portions 233 which respectively extend forwardly from a left side and a right side of the second base portion 231.

Figure 17:
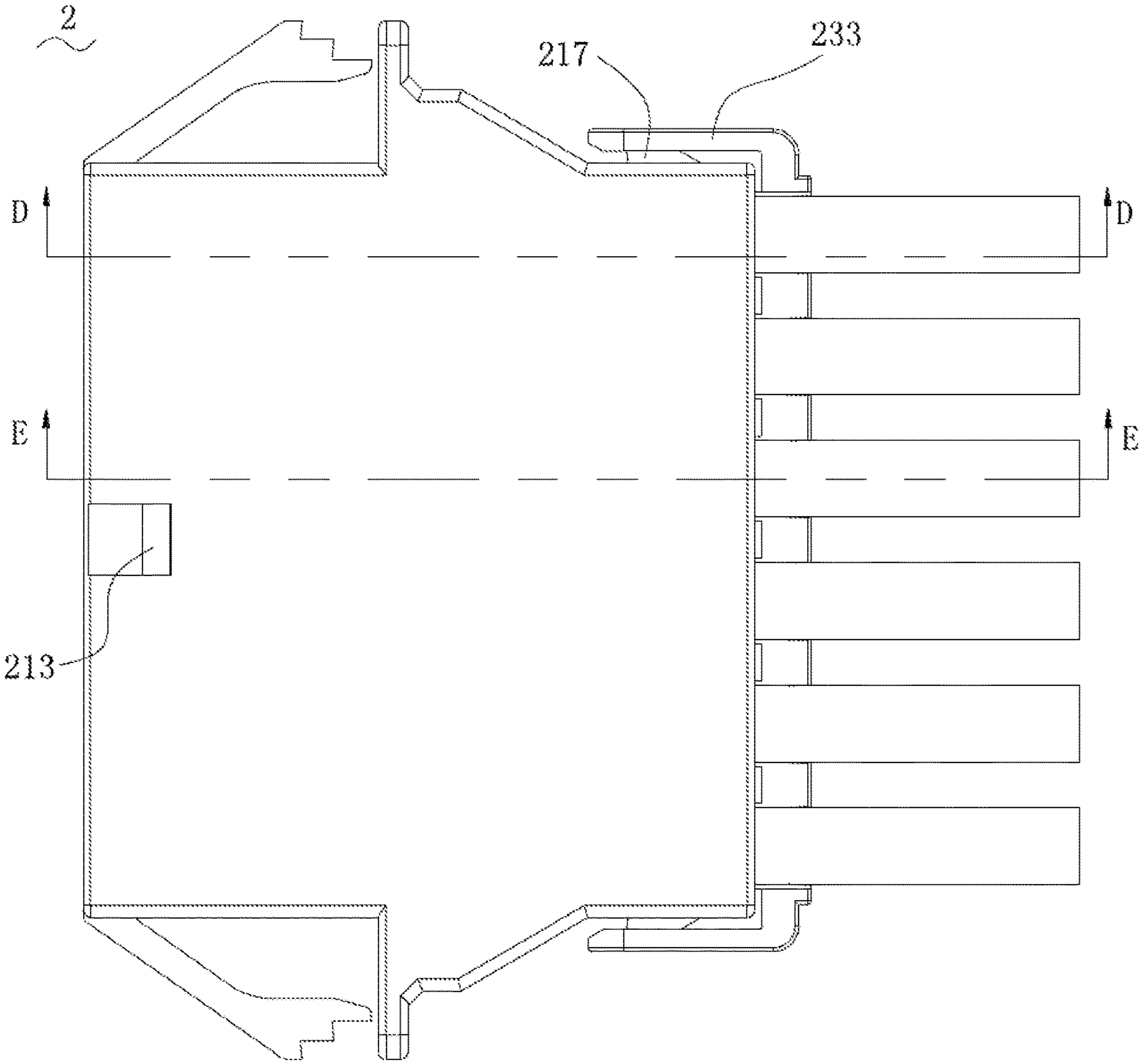
FIG. 17 is a top view of a second electrical connector of FIG. 1.

In combination with FIG. 17 and FIG. 18, the second terminal position assurance component 23 is mounted to a rear end of the second connector housing 21. The second locking portion 233 and the second latch 217 are locked with each other. The second terminal abutting portion 232 enters into the corresponding second terminal receiving cavity 214, abuts against the second limiting pieces 2232 of the corresponding second conductive terminal 22 from behind to prevent the corresponding second conductive terminal 22 from withdrawing rearwardly.

Figure 19:
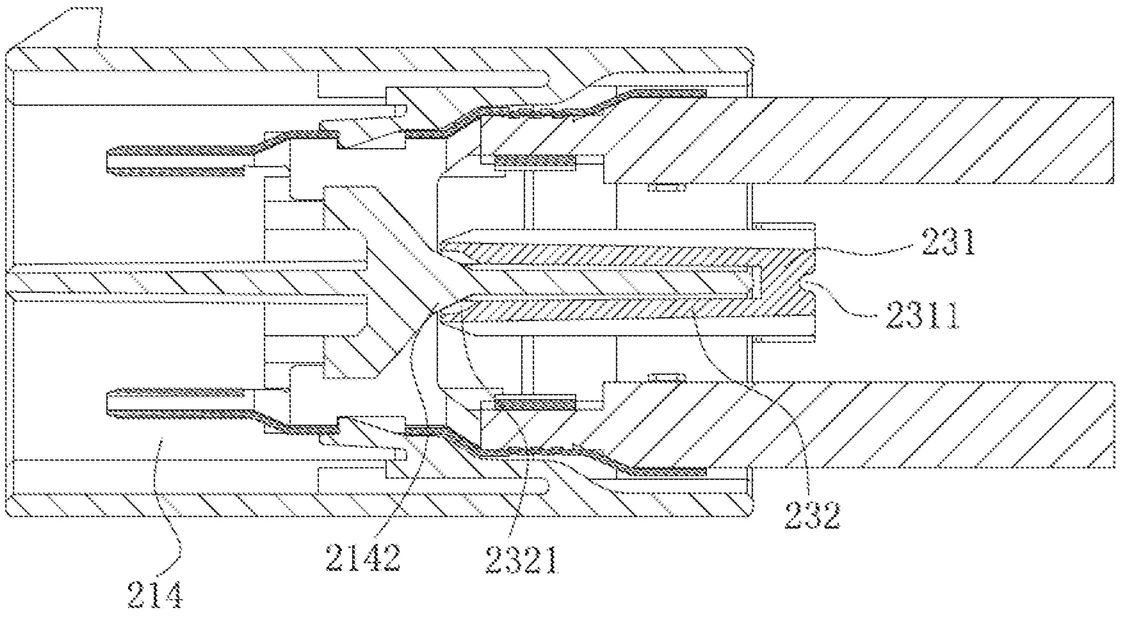
FIG. 19 is a cross sectional view taken along a line E-E of FIG. 17.

As shown in FIG. 19, a front end of the second terminal abutting portion 232 is provided with a second guiding notch 2321, a second guide protruding rib 2142 protrudes into the corresponding second terminal receiving cavity 214, the second guiding notch 2321 and the second guide protruding rib 2142 cooperate with each other to facilitate alignment of the second terminal abutting portion 232 with the second limiting pieces 2232 of the second conductive terminal 22. A rear surface of the second base portion 231 is provided with a second recessed groove 2311 which extends along a transverse direction, may allow the second terminal abutting portions 232 in an upper row and the second terminal abutting portions 232 in a lower row to splay so as to facilitate mounting of the second terminal position assurance component 23 into the second connector housing 21.

In combination with the structure of the first electrical connector 1 and the structure of the second electrical connector 2 as above, further referring to FIG. 1 to FIG. 4, when the first electrical connector 1 and the second electrical connector 2 mate with each other, the plurality of mating posts 113 of the first electrical connector 1 correspondingly insert into the plurality of second terminal receiving cavities 214 of the second electrical connector 2, the first prevent mis-insertion protruding ribs 115 corresponding insert into the first prevent mis-insertion notches 215, the second prevent mis-insertion protruding rib 116 correspondingly inserts into the second prevent mis-insertion notch 216, so that the first electrical connector 1 and the second electrical connector 2 may be correctly mated. The locking mechanism 112 of the first electrical connector 1 and the locking protrusion 213 of the second electrical connector 2 are locked with each other to make connection between the first electrical connector 1 and the second electrical connector 2 more firm. The connector position assurance component 14 further may prevent locking of the locking mechanism 112 and the locking protrusion 213 from being released, and further strengthen the connection between the first electrical connector 1 and the second electrical connector 2.

The first mating portion 121 of the first conductive terminal 12 and the second mating portion 221 of the second conductive terminal 22 are electrically connected to establish an electrical connection pathway between the first electrical connector 1 and the second electrical connector 2. The first terminal position assurance component 13 abuts against the plurality of first conductive terminals 12 from behind, the second terminal position assurance component 23 abuts against the second conductive terminal 22 from behind, the first terminal position assurance component 13 and the first terminal position assurance component 13 may resist acting forces when the first conductive terminal 12 and the second conductive terminal 2 mate with each other, assure that the first conductive terminal 12 and the second conductive terminal 2 each do not withdraw rearwardly, promote reliability of the electrical connection between the first conductive terminal 12 and the second conductive terminal 22.

When the first electrical connector 1/the second electrical connector 2 is assembled, the first conductive terminal 12/the second conductive terminal 22 is mounted into the first connector housing 11/the second connector housing 21 from the rear to the front, then the first terminal position assurance component 13/the second terminal position assurance component 23 is inserted into the first connector housing 11/the second connector housing 21 and is fixed to the rear end of the first connector housing 11/the rear end of the second connector housing 21. By the first terminal position assurance component 13/the second terminal position assurance component 23, the first conductive terminals 12 in the upper row and the first conductive terminals 12 the lower row/the second conductive terminals 22 in the upper row and the second conductive terminals 22 the lower row may be assured in position, the first terminal position assurance component 13/the second terminal position assurance component 23 is simple in structure and is convenient in assembling.

The above described contents are only the preferred embodiments of the present disclosure, which cannot limit the implementing solutions of the present disclosure, those skilled in the art may conveniently make corresponding variation or modification based on the main concept and spirit of the present disclosure, therefore the extent of protection of the present disclosure shall be determined by terms of the claims.

What is claimed is:

1. A first electrical connector, comprising:

a first connector housing comprising a main body, a locking mechanism which extend forwardly from an upper surface of the main body and a plurality of mating posts which extend forwardly a front surface of the main body, each mating post being interiorly formed with a first terminal receiving cavity which penetrates in a front-rear direction, a first prevent mis-insertion protruding rib protruding from a middle portion of at least one of the mating posts, and a second prevent mis-insertion protruding rib protruding from a side edge of at least one of the mating posts; and a plurality of first conductive terminals which are correspondingly inserted into the mating posts, each first conductive terminal comprising a first mating portion which is received in the corresponding first terminal receiving cavity and a first tail portion which is positioned behind the first mating portion.

2. The first electrical connector according to claim 1, wherein the first prevent mis-insertion protruding rib protrudes upwardly from a middle portion of an upper surface of the corresponding mating post or protrudes downwardly from a middle portion of a lower surface of the corresponding mating post;

the second prevent mis-insertion protruding rib protrudes upwardly from a side edge of an upper surface of the corresponding mating post or protrudes downwardly from a side edge of a lower surface of the corresponding mating post.

3. The first electrical connector according to claim 2, wherein the first prevent mis-insertion protruding rib is elongated and a width of the first prevent mis-insertion protruding rib is less than a width of the corresponding mating post, and a slot is formed at a position where the first prevent mis-insertion protruding rib and the mating post are connected, the slot is communicated with the first terminal receiving cavity.

4. The first electrical connector according to claim 2, wherein the second prevent mis-insertion protruding rib is solid piece-shaped, and a width of the second prevent mis-insertion protruding rib is less than a width of the corresponding mating post, the first terminal receiving cavity forms an opening in a front surface of the corresponding mating post, and the opening is rectangular.

5. The first electrical connector according to claim 1, wherein the plurality of mating posts of the first connector housing are provided as an upper row and a lower row, the first prevent mis-insertion protruding rib and the second prevent mis-insertion protruding rib provided to the mating posts in the upper row and the first prevent mis-insertion protruding rib and the second prevent mis-insertion protruding rib provided to the mating posts in the lower row are provided away from each other in an up-down direction.

6. The first electrical connector according to claim 1, wherein the first electrical connector further comprises a first terminal position assurance component, the first terminal position assurance component comprises a first base portion and a plurality of first terminal abutting portions, a rear surface of the first base portion is provided with a first recessed groove which extends along a transverse direction;

the first terminal abutting portions respectively extend forwardly from an upper side and a lower side of the first base portion, and each of the first terminal abutting portions enters into the corresponding first terminal receiving cavity to abut against the corresponding first conductive terminal from behind, a front end of each first terminal abutting portion is provided with a first guiding notch which is recessed.

7. The first electrical connector according to claim 1, wherein the locking mechanism comprises two side locking arms which are spaced apart from each other, a front locking arm which is connected to front ends of the two side locking arms, and a rear locking arm which is connected to rear ends of the two side locking arms;

the first electrical connector further comprises a connector position assurance component, the connector position assurance component can enter into between the two side locking arms from below the rear locking arm and can snap with the locking mechanism.

8. The first electrical connector according to claim 1, wherein the first connector housing further is provided with a covering portion around an outer periphery of the locking mechanism from outside, the covering portion comprises two side covering boards which are spaced apart from each other and an upper covering board which is connected to upper ends of the two side covering boards;

the two side covering boards of the covering portion are respectively positioned at two sides of the locking mechanism and surround the locking mechanism therein.

9. A second electrical connector, comprising:

a second connector housing having a plurality of second terminal receiving cavities which are recessed from a front surface of the second connector housing, a locking protrusion which protrudes from an upper surface of the second connector housing, and an elastic snapping claw which extends rearwardly from each of two side surfaces of the second connector housing and two stopping portions which are respectively positioned at an upper side and a lower side of each corresponding snapping claw, a first prevent mis-insertion notch being recessed from a middle portion of at least one of the second terminal receiving cavities, and a second prevent mis-insertion notch being recessed from a side of at least one of second terminal receiving cavities; and a plurality of second conductive terminals, each second conductive terminal comprising a second mating portion which is inserted into the corresponding second terminal receiving cavity and a second tail portion which is positioned behind the second mating portion.

10. The second electrical connector according to claim 9, wherein a width of the first prevent mis-insertion notch is less than a width of the corresponding second terminal receiving cavity, the first prevent mis-insertion notch is recessed upwardly from a middle portion of an upper wall of the corresponding second terminal receiving cavity, or is recessed downwardly from a middle portion of a lower wall of the corresponding second terminal receiving cavity.

11. The second electrical connector according to claim 10, wherein a width of the second prevent mis-insertion notch is less than a width of the corresponding second terminal receiving cavity;

the second prevent mis-insertion notch is recessed upwardly from a side of an upper wall of the corresponding second terminal receiving cavity, or is recessed downwardly from a side of a lower wall of the corresponding second terminal receiving cavity.

12. The second electrical connector according to claim 9, wherein the plurality of second terminal receiving cavities of the second connector housing are provided as an upper row and a lower row, the first prevent mis-insertion notch and the second prevent mis-insertion notch provided to the second terminal receiving cavities in the upper row and the first prevent mis-insertion notch and the second prevent mis-insertion notch provided to the second terminal receiving cavities in the lower row are provided away from each other in an up-down direction.

13. The second electrical connector according to claim 9, wherein an outer surface of a rear end of the elastic snapping claw is provided with a plurality of step stopping faces; the stopping portions each are flat board shaped.

14. The second electrical connector according to claim 9, wherein the second electrical connector further comprises a second terminal position assurance component, the second terminal position assurance component snaps to a rear end of the second connector housing and abuts against the plurality of second conductive terminals from behind.

15. The second electrical connector according to claim 14, wherein the second terminal position assurance component comprises a second base portion and a plurality of second terminal abutting portions, a rear surface of the second base portion is provided with a second recessed groove which extend along a transverse direction;

the plurality of second terminal abutting portions respectively extend forwardly from an upper side and a lower side of the second base portion and correspondingly enter into the plurality of second terminal receiving cavities, a front end of each second terminal abutting portion is provided with a second guiding notch which is recessed.

16. An electrical connector assembly, comprising a first electrical connector and a second electrical connector, the first electrical connector, comprising:

a first connector housing comprising a main body, a locking mechanism which extend forwardly from an upper surface of the main body and a plurality of mating posts which extend forwardly a front surface of the main body, each mating post being interiorly formed with a first terminal receiving cavity which penetrates in a front-rear direction, a first prevent mis-insertion protruding rib protruding from a middle portion of at least one of the mating posts, and a second prevent mis-insertion protruding rib protruding from a side edge of at least one of the mating posts; and a plurality of first conductive terminals which are correspondingly inserted into the mating posts, each first conductive terminal comprising a first mating portion which is received in the corresponding first terminal receiving cavity and a first tail portion which is positioned behind the first mating portion, the second electrical connector, comprising:

a second connector housing having a plurality of second terminal receiving cavities which are recessed from a front surface of the second connector housing, a locking protrusion which protrudes from an upper surface of the second connector housing, and an elastic snapping claw which extends rearwardly from each of two side surfaces of the second connector housing and two stopping portions which are respectively positioned at an upper side and a lower side of each corresponding snapping claw, a first prevent mis-insertion notch being recessed from a middle portion of at least one of the second terminal receiving cavities, and a second prevent mis-insertion notch being recessed from a side of at least one of second terminal receiving cavities; and a plurality of second conductive terminals, each second conductive terminal comprising a second mating portion which is inserted into the corresponding second terminal receiving cavity and a second tail portion which is positioned behind the second mating portion, the mating post of the first connector housing inserting into the corresponding second terminal receiving cavity of the second connector housing so as to make the first mating portion of the first conductive terminal and the second mating portion of the corresponding second conductive terminal electrically connected, the first prevent mis-insertion protruding rib inserting into the corresponding first prevent mis-insertion notch, the second prevent mis-insertion protruding rib inserting into the corresponding second prevent mis-insertion notch, the locking mechanism and the locking protrusion being locked with each other.

17. An electrical connector, comprising:

a connector housing, the connector housing being provided with a plurality of terminal receiving cavities which each penetrate in a front-rear direction and a plurality of guide protruding ribs which respectively protrude into the plurality of terminal receiving cavities, the plurality of terminal receiving cavities being arranged as an upper row and a lower row, two latches being provided in a left side and a right side of the connector housing respectively;

a plurality of conductive terminals which are correspondingly mounted to the plurality of terminal receiving cavities; and a terminal position assurance component comprising:

a base portion, a rear surface of the base portion being provided with a recessed groove which extends along a transverse direction;

a plurality of terminal abutting portions which respectively extend forwardly from an upper side and a lower side of the base portion and correspondingly enter into the plurality of terminal receiving cavities, the plurality of terminal abutting portions forwardly abutting against the plurality of conductive terminals respectively to prevent the plurality of conductive terminals from withdrawing rearwardly from the connector housing, a front end of each terminal abutting portion being provided with a guiding notch which cooperates with the corresponding guide protruding rib; and two locking portions which respectively extend forwardly from a left side and a right side of the base portion and respectively lock with the two latches.

18. The electrical connector according to claim 17, wherein the recessed groove is positioned at a center of the base portion, and penetrates the left side and the right side of the base portion in the transverse direction.

19. The electrical connector according to claim 17, wherein the terminal abutting portions extending from the upper side of the base portion and the terminal abutting portions extending from the lower side of the base portion are arranged to be symmetric relative to each other.

20. The electrical connector according to claim 19, wherein the connector housing is provided with a middle partitioning board which extends in the transverse direction to partition the terminal receiving cavities in the upper row and the terminal receiving cavities in the lower row, the plurality of guide protruding ribs respectively protrude from an upper surface and a lower surface of the middle partitioning board into the plurality of terminal receiving cavities;

wherein the guiding notches of the two terminal abutting portions which arranged in an up-down direction are provided to face each other.

21. The electrical connector according to claim 20, wherein the guide protruding rib obliquely extends along the up-down direction and is gradually away from the middle partitioning board as the guide protruding rib extends forwardly.

22. The electrical connector according to claim 21, wherein the conductive terminal comprises a mating portion, a tail portion positioned behind the mating portion, and a connecting portion connected between the mating portion and the tail portion, the connecting portion is provided with a limiting piece which protrudes along the up-down direction, the terminal abutting portion abuts against the limiting piece from behind.

23. The electrical connector according to claim 22, wherein two limiting portions are provided at two sides of the guide protruding rib in the terminal receiving cavity, the limiting piece of the conductive terminal abuts against the limiting portion from behind.

24. The electrical connector according to claim 17, wherein the connector housing comprises a main body and a plurality of mating posts which forwardly extend from a front surface of the main body;

the main body is interiorly formed a plurality of terminal rear receiving cavities;

each mating post is interiorly provided with a terminal front receiving cavity;

the terminal front receiving cavity and the corresponding terminal rear receiving cavity are communicated with each other in the front-rear direction to form the terminal receiving cavity;

a first prevent mis-insertion protruding rib protrudes from a middle portion of at least one of the mating posts; and a second prevent mis-insertion protruding rib protrudes from a side edge of at least one of the mating posts.

25. The electrical connector according to claim 17, wherein the terminal receiving cavities are recessed from a front surface of the connector housing and penetrate a rear surface of the connector housing;

a first prevent mis-insertion notch is recessed from a middle portion of at least one terminal receiving cavity, and a second prevent mis-insertion notch is recessed from a side of at least one terminal receiving cavity.

26. The electrical connector according to claim 25, wherein an elastic snapping claw extends rearwardly from each of the left side and the right side of the connector housing, an outer surface of a rear end of the elastic snapping claw is provided with a plurality of step stopping faces;

a stopping portion is provided at each of an upper side and a lower side of the elastic snapping claw and is in a flat board shaped.

* * * * *